United States Patent [19]
Campbell et al.

[11] Patent Number: 4,730,097
[45] Date of Patent: Mar. 8, 1988

[54] DUAL MODE WINDSHIELD HEATER CONTROL

[75] Inventors: Robert W. Campbell; Donald O. Ruff, both of Anderson, Ind.

[73] Assignee: General Motors Corporation, Detroit, Mich.

[21] Appl. No.: 50,582

[22] Filed: May 15, 1987

Related U.S. Application Data

[63] Continuation-in-part of Ser. No. 896,816, Aug. 15, 1986, abandoned.

[51] Int. Cl.[4] ............................ H05B 1/02; B60L 1/02
[52] U.S. Cl. .................................... 219/203; 219/522; 219/547; 322/7
[58] Field of Search ............... 219/203, 219, 522, 547; 52/171; 322/7, 80, 37, 97

[56] References Cited

U.S. PATENT DOCUMENTS

| | | | |
|---|---|---|---|
| 3,858,027 | 12/1974 | Phillips | 219/203 |
| 3,898,423 | 8/1975 | Taylor et al. | 219/203 |
| 3,944,893 | 3/1976 | Hayden | 219/203 X |
| 3,973,140 | 8/1976 | Phillips | 219/203 X |
| 4,084,126 | 4/1978 | Clements | 219/202 X |
| 4,267,433 | 5/1981 | Sahm, III | 219/203 X |
| 4,277,672 | 7/1981 | Jones | 219/203 X |
| 4,434,358 | 2/1984 | Apfelbeck et al. | 219/203 X |
| 4,506,137 | 3/1985 | Meister | 219/203 |
| 4,520,258 | 5/1985 | Grohmann | 219/203 X |
| 4,539,466 | 9/1985 | Yamamoto | 219/203 |
| 4,555,743 | 11/1985 | Kokubu et al. | 219/203 X |
| 4,565,919 | 1/1986 | Bitter et al. | 219/203 X |
| 4,673,797 | 6/1987 | Weirick | 219/203 |

Primary Examiner—Patrick R. Salce
Assistant Examiner—Emanuel Todd Voeltz
Attorney, Agent, or Firm—Tim G. Jaeger

[57] ABSTRACT

A windshield heater element for an automotive vehicle is controlled to provide a maximum power deice mode of operation and a reduced power defog mode of operation. The deice mode of operation is initiated in response to an operator actuated deice command and is terminated in response to the first to occur of expiration of a predetermined time period after initiation, or an operator actuated off command. The defog mode of operation is initiated in response to termination of a preceding deice mode of operation provided that such termination was not in response to an operator actuated off command, or an operator actuated defog command. The defog mode of operation is terminated in response to the first to occur of expiration of a predetermined time period after initiation provided that such initiation was not in response to an operator actuated defog command, or an operator actuated off command. Further, the deice mode of operation is permitted only when the vehicle transmission is in the park or neutral state, and the idle speed of the engine is raised above the normal idle speed to ensure that the power produced by the engine driven generator is adequate to meet the combined power requirement of the windshield heater element and other vehicle loads during the deice mode of operation. Additionally, the energization of the heater element is terminated or prohibited in response to detection of an abnormally high windshield temperature condition, an abnormally low battery voltage condition, an abnormally low heater current condition, or vehicle ignition shut-off.

10 Claims, 19 Drawing Figures

DUAL MODE WINDSHIELD HEATER CONTROL

This is a continuation-in-part of prior copending patent application Ser. No. 896,816 filed Aug. 15, 1986 now abandoned.

This invention relates to a method and apparatus for providing device and defog modes of operation for the heated windshield of an automotive vehicle.

The invention is particularly applicable to a windshield heater of the high power type employing a resistive element formed by a transparent film or layer uniformly distributed within or over the window glass. The invention is also particularly applicable to a motor vehicle including an engine driven generator for supplying electrical power to the windshield heater element dependent upon the idle speed of the engine when the vehicle transmission is in the park or neutral state.

In one aspect, the invention contemplates a deice mode of operation in which the heater element is energized at maximum power to produce maximum heat effective to remove ice and frost from the exterior surface of the windshield. The deice mode of operation is initiated in response to an operator actuated deice command and is terminated in response to the first to occur of expiration of a predetermined time period after initiation, or an operator actuated off command.

In another aspect, the invention contemplates a defog mode of operation in which the heater element is energized at reduced power to produce reduced heat effective to remove condensation from the interior surface of the windshield and/or to help prevent the formation of ice or frost on the exterior surface of the windshield. The defog mode of operation is initiated in response to termination of a preceding deice mode of operation provided that such termination was not in response to an operator actuated off command, or an operator actuated defog command. The defog mode of operation is terminated in response to the first to occur of expiration of a predetermined time period after initiation provided that such initiation was not in response to an operator actuated defog command, or an operator off command.

In a further aspect of the invention, the deice mode of operation is permitted only when the vehicle transmission is in the park or neutral state, and the idle speed of the vehicle engine is raised above the normal idle speed to ensure that the power produced by the engine driven generator is adequate to satisfy the combined power requirement of the windshield heater element and other vehicle loads during the deice mode of operation.

Pursuant to additional aspects of the invention, energization of the window heater is terminated or prohibited in response to detection of an abnormally high windshield temperature condition, an abnormally low battery voltage condition, an abnormally low heater current condition, and vehicle ignition shut-off.

In one embodiment of the invention, there are three operator actuated input switches: a deice command switch, a defog command switch, and an off command switch. In an alternative embodiment of the invention, a single input switch is used for all three commands. In operation, the latter embodiment is characterized by a timed cycle and a continuous cycle.

In one aspect of the single switch embodiment, the timed cycle is initiated in response to initial operator actuation of the single switch when the vehicle transmission is in the park or neutral state (constituting a deice command) and thereafter may be terminated at any time by subsequent operator actuation of the single switch (constituting an off command). Similarly, the continuous cycle is initiated in response to initial operator actuation of the single switch when the vehicle transmission is in other than the park or neutral state (constituting a defog command) and is thereafter terminated in response to subsequent operator actuation of the single switch (constituting an off command).

In another aspect of the single switch embodiment, the timed cycle includes (unless earlier terminated) a high heat deice mode of operation which is initiated when the time cycle is initiated and which is terminated in response to the first to occur of expiration of a predetermined deice time period after initiation, or shifting of the vehicle transmission to other than the park or neutral state. The timed cycle further includes (unless earlier terminated) a low heat defog mode of operation which is initiated in response to termination of the deice mode of operation and which is terminated at the expiration of a predetermined defog time period after initiation. The continuous cycle consists of a low heat defog mode of operation which is initiated when the continuous cycle is initiated and which is terminated when the continuous cycle is terminated.

The foregoing and other aspects, advantages and features of the invention may be better understood by reference to the following detailed disclosure which is divided into four parts. Part I is generally directed to an exemplary vehicle electrical system of the low DC voltage type to which the instant invention is particularly applicable. Part II is generally directed to the high DC voltage power supply aspects of the invention. Part III is generally directed to the dual mode heated windshield control aspects of the invention. Part IV is generally directed to digital computer implementations of the dual mode heated windshield control aspects of the invention. The detailed disclosure includes the accompanying drawing in which:

Figure 4:
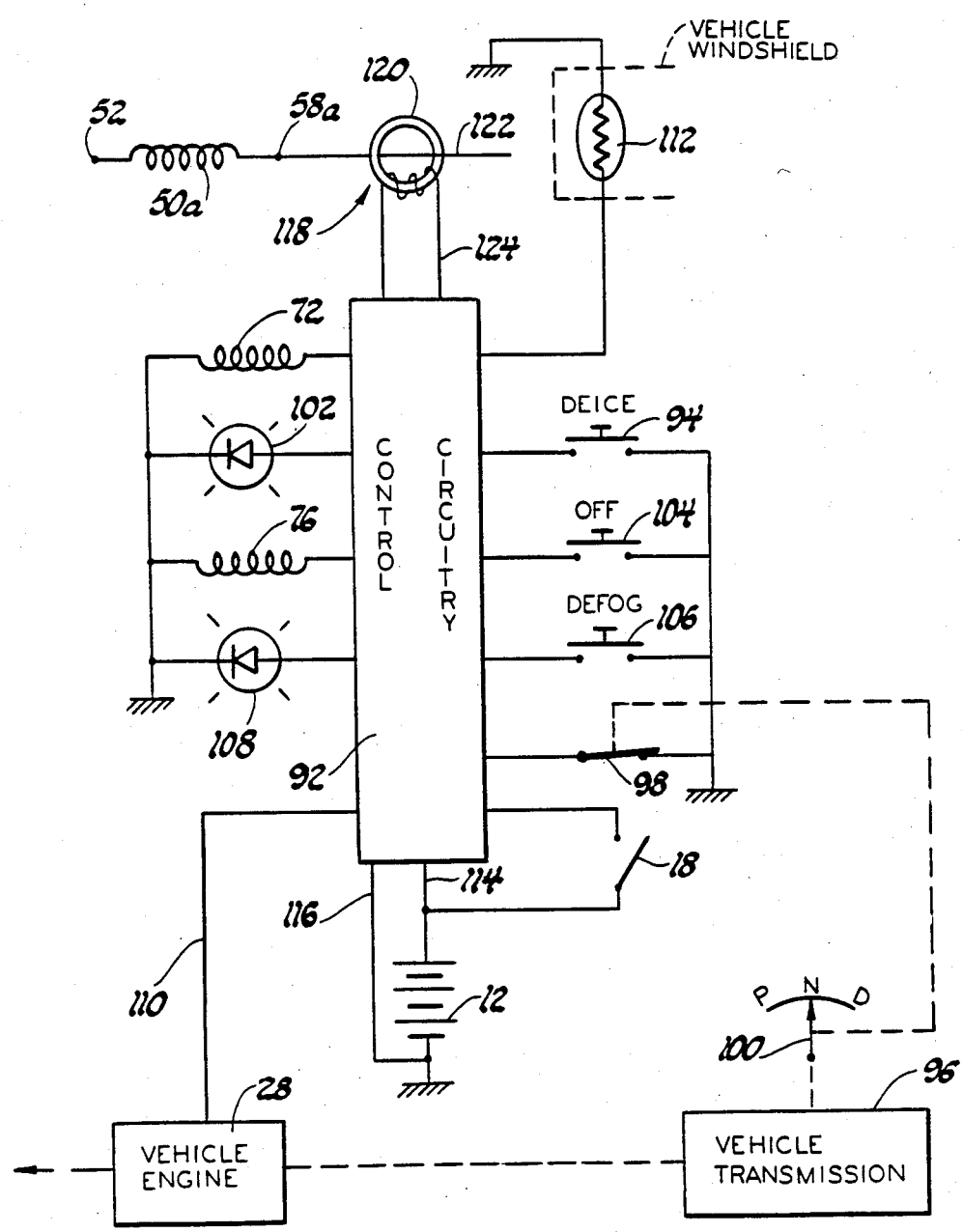
FIG. 4 is a schematic diagram depicting a dual mode heated windshield control incorporating the principles of the invention.

FIGS. 6 through 16 inclusive are flow diagrams useful in explaining the operation of the FIG. 4 digital computer implementation of the invention.

Figure 17:
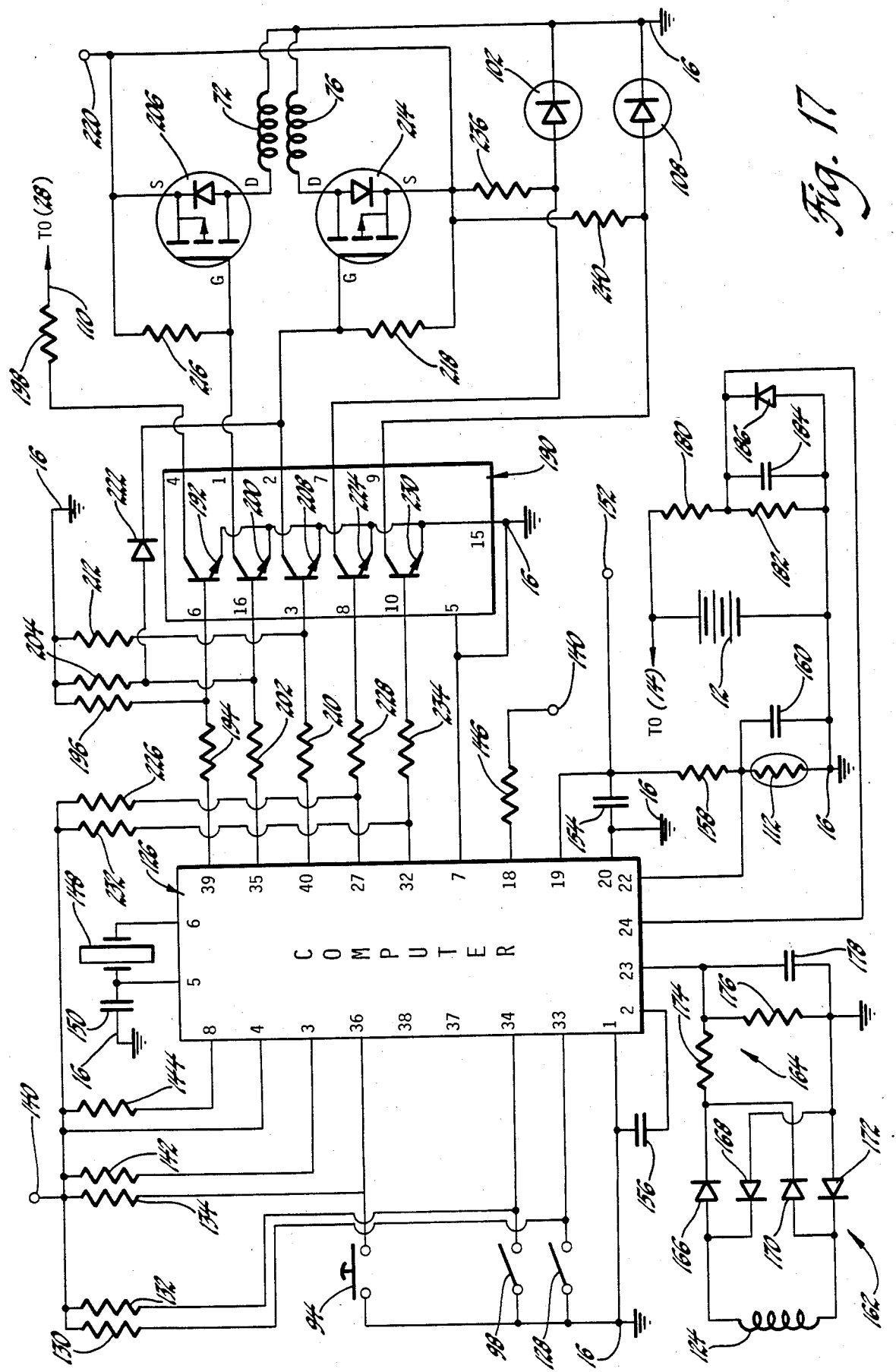

FIG. 17 is a schematic diagram of a digital computer implementation of an alternative dual mode heated windshield control in accordance with the principles of the invention and featuring a single operator actuated input switch.

Figure 18:
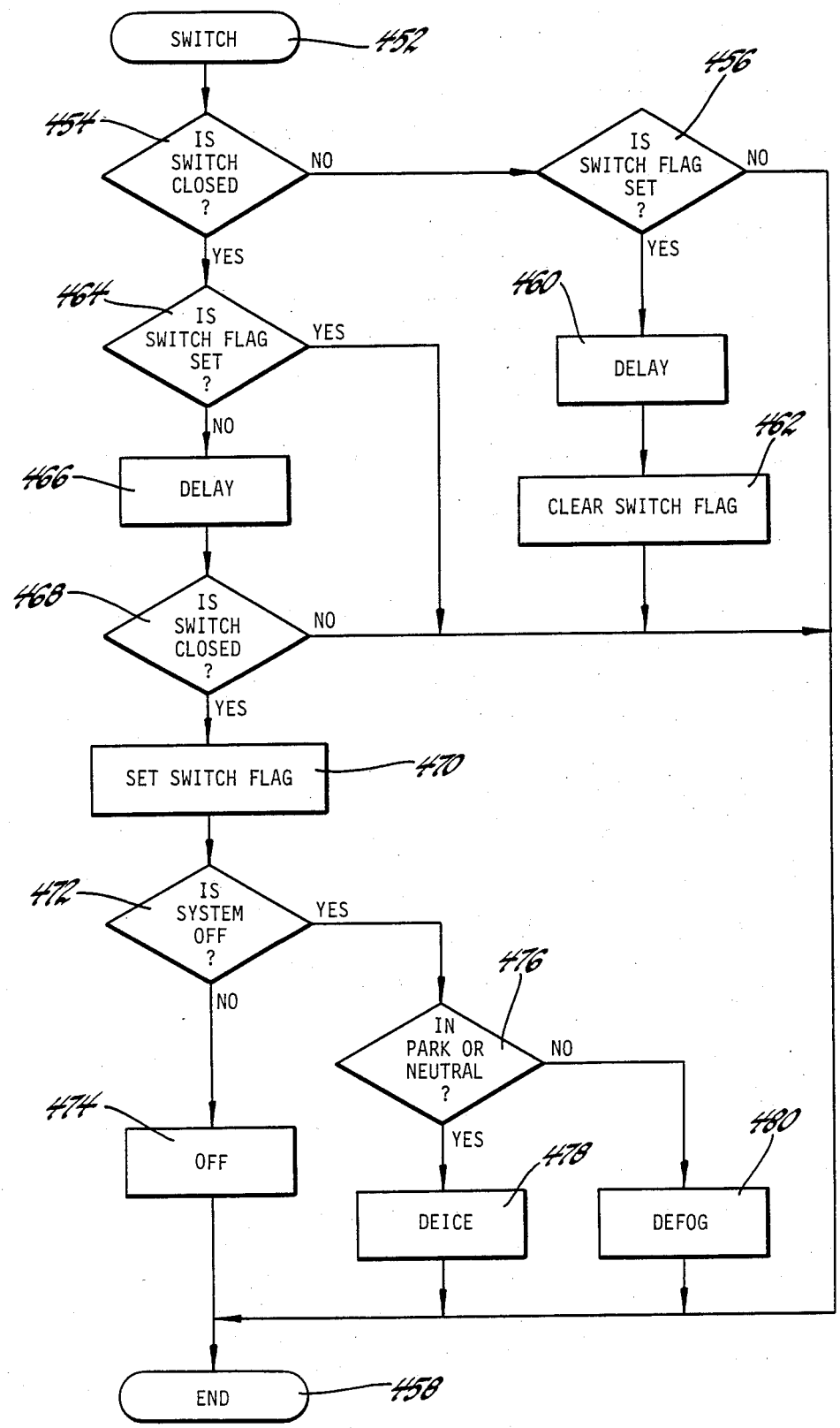

FIG. 18 is a flow diagram useful in explaining the operation of the FIG. 17 digital computer implementation of the invention.

I

EXEMPLARY MOTOR VEHICLE ELECTRICAL SYSTEM

Figure 1:
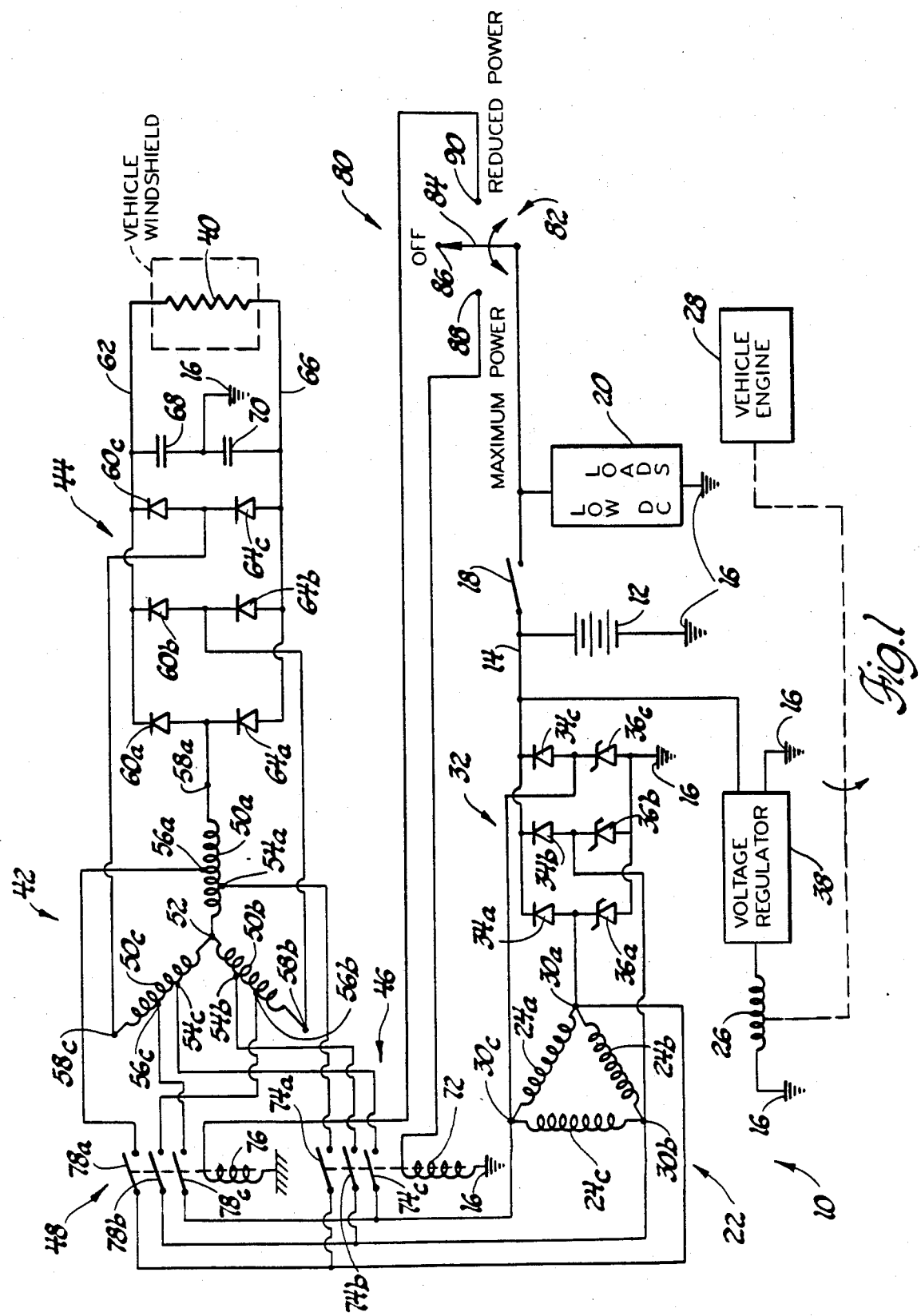
FIG. 1 is a schematic diagram of a motor vehicle electrical system incorporating the principles of the invention.

Referring to the drawing, FIG. 1 includes an automotive vehicle electrical system 10 of the low DC voltage type. A storage battery 12 provides standby power at the low DC voltage, e.g., a nominal magnitude of fourteen volts. The positive terminal of the battery 12 is connected to a DC power line 14 while the negative terminal of the battery 12 is connected to system ground 16. Also connected between the DC power line 14 and system ground 16, through normally open contact 18 which may be part of the vehicle ignition switch, are various low DC voltage loads collectively represented by block 20. The low DC voltage loads 20 would normally include such things as the starter motor, vehicle lights, radio, electrical instruments, cigarette lighter, power door locks, power seat adjusters, power window operators, and the like.

The electrical system 10 also includes a three-phase AC generator 22 having stationary output windings 24a, 24b and 24c and a rotatable field winding 26 mechanically driven by the vehicle engine 28. In operation, a low three-phase AC voltage is developed across the phase windings 24a, 24b, and 24c having an amplitude determined by the amount of current fed through the field winding 26 and having a frequency determined by the rotating speed of the field winding 26. The low three-phase AC voltage is carried by AC power lines 30a, 30b and 30c.

A three-phase full wave bridge rectifier 32 includes positively poled diodes 34a, 34b and 34c connected between the AC power lines 30a, 30b and 30c, respectively, and the DC power line 14. The rectifier 32 further includes negatively poled avalanche diodes 36a, 36b and 36c connected between the AC power lines 30a, 30b and 30c, respectively, and system ground 16. In operation, the rectifier 32 is responsive to the low three-phase AC voltage put out by the generator 22 via the AC power lines 30a, 30b and 30c to rectify the same to provide a low DC voltage, between the DC power line 14 and system ground 16, for changing the battery 12 and supplying the various low DC voltge loads 20 of the vehicle.

A voltage regulator 38 is responsive to the magnitude of the low DC voltage put out by the bridge rectifier 32 between the DC power line 14 and system ground 16 to regulate the amount of current fed from the battery 12 through the field winding 26 of the generator 22 to cause the amplitude of the low-three-phase AC voltage to be correct to produce a low DC voltage of the desired magnitude, e.g., nominally fourteen volts, between the DC power line 14 and system ground 16 upon rectification by the rectifier 32. Preferably, the voltage regulator 38 is of the type shown in U.S. Pat. No. 3,098,964 or U.S. Pat. No. 4,636,706 which are incorporated herein by reference.

It will be appreciated that, as so far described, the motor vehicle electrical system 10 is of common type and is shown by way of illustration only and not by way of any limitation upon the invention. As will be apparent to those skilled in the art, various modifications and alterations may be made to the electrical system 10 within the context of the present invention. In particular, the generator 22 may take other well-known forms effective to provide the required low three-phase AC voltage.

II

HIGH DC VOLTAGE POWER SUPPLY

It is sometimes necessary or desirable in an automotive vehicle to electrically energize an accessory load or the like that requires a DC voltage having substantially greater magnitude than the low DC voltage (e.g., nominally fourteen volts) provided in the usual vehicle electrical system of the type previously described. One example of such a high DC voltage load is a windshield heater of the kind in which the window glass includes a transparent, resistive layer or film. In such a windshield heater, the terminal-to-terminal resistance of the heating element may be on the order of 2 to 4 ohms and a DC voltage several times the nominal fourteen volt DC voltage of the ordinary motor vehicle electrical system is required to develop the up to 1500 watts of power that may be necessary to satisfactorily heat the windshield. The present invention provide a high DC voltage power supply for a motor vehicle effective to advantageously energize a high DC voltage load such as a high-power windshield heater.

Referring to the drawing, a high DC voltage load, which may be a high-power windshield heater of the kind previously described, is schematically depicted as an ungrounded resistance 40. A high DC voltage power supply for energizing the high-power load 40 includes a three-phase autotransformer 42, a three-phase full-wave bridge rectifier 44, and a pair of switching relays 46 and 48.

The autotransformer 42 includes phase windings 50a, 50b and 50c connected in a wye configuration having an ungrounded neutral node or terminal at 52. The phase windings 50a, 50b and 50c are equipped with a first set of input terminals or taps 54a, 54b, and 54c, a second set of input terminals or taps 56a, 56b, and 56c, and a set of output terminals 58a, 58b, and 58c. In operation, the autotransformer 42 responds to the application of the low three-phase AC voltage put out by the generator 22 to step up the amplitude of the same to provide a high three-phase AC voltage at the output terminals 58a, 58b, and 58c. More particularly, the application of the low three-phase AC voltage to the first set of input terminals 54a, 54b, and 54c results in the development of a first high three-phase AC voltage at the output terminasl 58a, 58b, and 58c while the application of the low three-phase AC voltage to the second set of input terminals 56a, 56b, and 56c results in the development of a second high three-phase AC voltage at the output terminals 58a, 58b, and 58c.

It will be appreciated that the phase windings 50a, 50b and 50c of the autotransformer 42 each serve the dual function of a primary winding and a secondary winding. For example, considering the phase winding 50a, the primary winding is formed by the length of the winding 50a between the input terminal 54a and the neutral node 52 while the secondary winding is formed by the entire length of the winding 50a between the output terminal 58a and the neutral node 52. In this manner, the turns ratio or voltage transformation ratio between the primary and secondary lengths of the winding 50a is such as to provide a step-up in voltage, i.e., the amplitude of the AC voltage developed between the output terminal 58a and the neutral node 52 is greater than the amplitude of the voltage applied between the input terminal 54a and the neutral node 52. The same is true as to the remaining two phase windings 50b and 50c.

Accordingly, owing to the variation in the spacing of the first set of input taps 54a, 54b, and 54c and the second set of input taps 56a, 56b, and 56c along the phase windings 50a, 50b and 50c in respect to the neutral node 52, the step-up voltage transformation ratio provided by the autotransformer 42 between the first set of input terminals 54a, 54b, and 54c and the output terminals 58a, 58b, and 58c is higher than the step-up voltage transformation ratio provided between the second set of input terminals 56a, 56b, and 56c and the output terminals 58a, 58b and 58c. As a consequence, the amplitude of the first high three-phase AC voltage is greater than the amplitude of the second high three-phase AC voltage.

It is to be noted that the autotransformer 42 provides cost, size and efficiency advantages as compared to a transformer having separate, isolated primary and secondary windings. These advantages are especially significant in the automotive vehicle context of the invention where cost, size and efficiency are vital concerns.

The three-phase full-wave bridge rectifier 44 includes positively poled diodes 60a, 60b and 60c connected between the output terminals 58a, 58b, and 58c, respectively, of the autotransformer 42 and one terminal 62 of the high DC voltage load 40. The rectifier 44 further includes negatively poled diodes 64a, 64b and 64c connected between the output terminals 58a, 58b, and 58c, respectively, of the autotransformer 42 and the other terminal 66 of the load 40. In operation, the rectifier 44 is responsive to the first and second high three-phase AC voltages appearing at the output terminals 58a, 58b, and 58c of the autotransformer 42 to rectify the same to provide corresponding first and second high DC voltages across the high DC voltage load 40 between the ungrounded load terminals 62 and 66. Consistent with the difference in amplitude between the first and second high three-phase AC voltages, the magnitude of the first high DC voltage is greater than the magnitude of the second high DC voltage.

Capacitors 68 and 70 are connected between system ground 16 and the load terminals 62 and 66, respectively, to provide appropriate suppression of radio frequency interference (RFI) emanating from the diode switching action taking place in the rectifier 44. Similar RFI suppression capacitors may be provided at other points in the system if desired, for example, between the AC power lines 30a, 30b and 30c, respectively, and system ground 16.

The pair of switching relays 46 and 48 control the application of the low three-phase AC voltage from the generator 22 to the autotransformer 42. Specifically, the first relay 46 includes a coil 72 which is effective when energized to close normally open contacts 74a, 74b and 74c to apply the low three-phase AC voltage from the AC power lines 30a, 30b and 30c of the generator 22 to the first set of input terminals 54a, 54b, and 54c of the autotransformer 42, respectively. Alternately, the second relay 48 includes a coil 76 which is effective when energized to close normally open contacts 78a, 78b and 78c to apply the low three-phase AC voltage from the AC power lines 30a, 30b and 30c of the generator 22 to the second set of input terminals 56a, 56b, and 56c of the autotransformer 42, respectively.

In summary, when the first relay 46 is activated, the autotransformer 42 and rectifier 44 are effective to transform and rectify the low three-phase AC voltage put out by the generator 22 to provide a high DC voltage at a first or upper level between the load terminals 62 and 66 to energize the load 40 at high (maximum) power. Alternately, when the second relay 48 is activated, the autotransformer 42 and rectifier 44 are effective to transform and rectify the low three-phase AC voltage put out by the generator 22 to provide a high DC voltage at a second or lower level between the load terminals 62 and 66 to energize the load 40 at low (reduced) power.

To control the activation of the relays 46 and 48, the invention contemplates an appropriate controller 80 which, in its most rudimentary form, may be provided by a manually operable switch 82 including a movable contact 84 and three fixed contacts 86, 88 and 90 corresponding to off, maximum power and reduced power positions, respectively, of the switch 82. The movable contact 84 is connected to the DC power line 14. The fixed contact 86 is unconnected while the fixed contacts 88 and 90 are connected to the relay coils 72 and 76, respectively. In the maximum power position of the switch 82, the movable contact 84 is in engagement with the fixed contact 88 and the relay 46 is activated to initiate and sustain the maximum (high) power mode of operation in which the load 40 is energized by the first high DC voltage. In the reduced power position of the switch 82, the movable contact 84 is in engagement with the fixed contact 90 and the relay 48 is activated to initiate and sustain the reduced (low) power mode of operation in which the load 40 is energized by the second high DC voltage. In the off position of the switch 82, the movable contact 84 is in engagement with the unconnected contact 86 to deactivate the relays 46 and 48 and thereby terminate and prohibit further energization of the load 40 in either the maximum (high) power mode or the reduced (low) power mode.

It will be readily appreciated that, within the scope of the invention, a greater or lesser number of high DC voltage levels can be obtained by adding or eliminating sets of autotransformer input taps (like set 54a, 54b and 54c, and set 56a, 56b, and 56c) and by similarly adding or eliminating corresponding switching relays (like relays 46 and 48). Further, it will be apparent that other equivalent switching devices and arrangements can, within the scope of the invention, be substituted for the relays 46 and 48.

While the high DC power supply of the invention (as previously described in respect to a specific embodiment) yields numerous advantages, a few are deserving of particular note.

Referring to FIG. 1 of the drawing, the high DC voltage load 40 is depicted as a resistance having ungrounded terminals 62 and 66. Under these circumstances, the high DC voltage developed across the load 40 is symmetrical with respect to the potential at the neutral 52 of the three-phase autotransformer 42. In other words, the potential at the load terminal 62 and the potential at the load terminal 66 are equally above and below the potential at the neutral 52 of the autotransformer 42, respectively. In turn, the neutral 52 of the three-phase autotransformer 42 is at the same potential as the imaginary neutral of the three-phase generator 22 which is approximately equivalent to one-half the nominal magnitude of the low DC voltage of the electrical system 10, or one-half the potential between the DC power line 14 and system ground 16.

Figure 2:
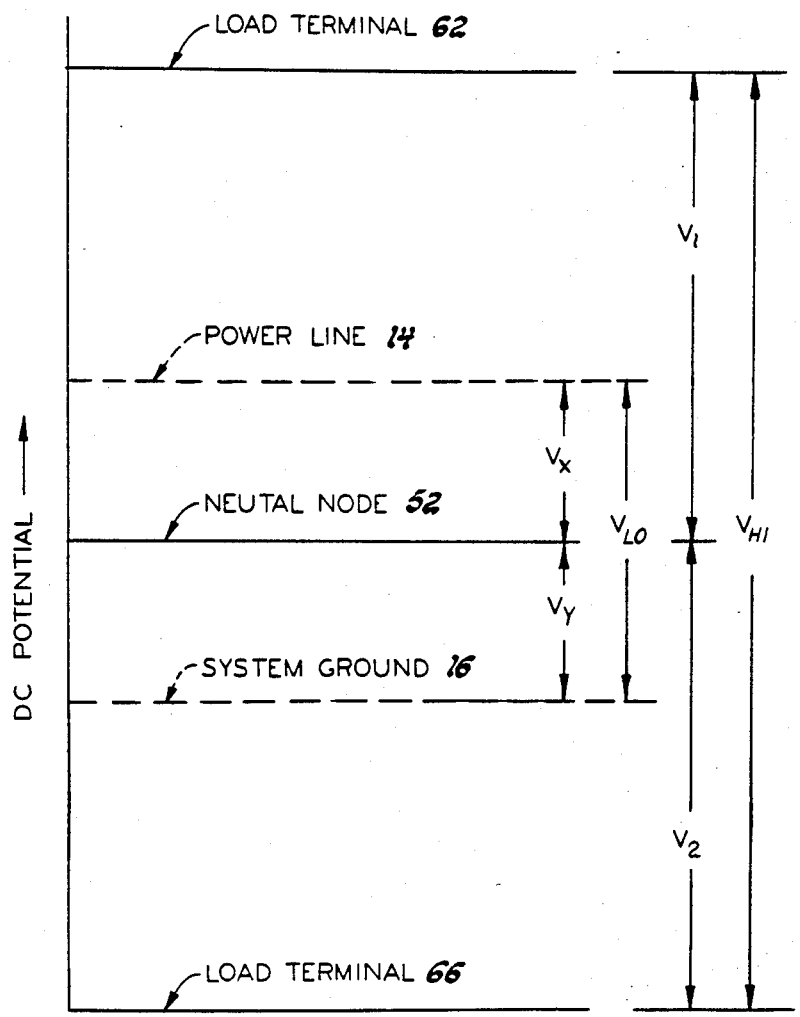
FIG. 2 is a graph of various DC voltage relationships useful in explaining the principles of the invention.

The foregoing DC voltage relationships are illustrated in FIG. 2. $V_{HI}$ is the DC voltage developed across the load 40 between the terminals 62 and 66. $V_1$ is the DC voltage appearing between the neutral 52 of the autotransformer 42 and the terminal 62 of the load 40 and is equal to one-half $V_{HI}$. $V_2$ is the DC voltage appearing between the neutral 52 of the autotransformer 42 and the terminal 66 of the load 40 and is also equal to one-half $V_{HI}$. $V_{LO}$ is the DC voltage developed between the DC power line 14 and system ground 16. $V_X$ is the DC voltage appearing between the power line 14 and the neutral 52 of the autotransformer 42 and is equal to one-half $V_{LO}$. $V_Y$ is the DC voltage appearing between system ground 16 and the neutral 52 of the autotransformer 42 and is equal to one-half $V_{LO}$. By way of example only and without any limitation whatever, the high voltage $V_{HI}$ is depicted in FIG. 2 as approximately three time greater than the low DC voltage $V_{LO}$.

As will be apparent from the DC voltage relationships shown in FIG. 2, the potential at load terminal 62 is above system ground 16 while the potential at load terminal 66 is below system ground 16. Accordingly, the voltage available for inadvertent discharge from either of the load terminals 62 and 66 to ground 16 is substantially lower than would otherwise be the case in an vehicle electrical system where one of the load terminals 62 and 66 was grounded. For example, in the latter kind of vehicle electrical system, if the load terminal 66 was connected to system ground 16, the entire high DC voltage would be available at the ungrounded load terminal 62 for inadvertent discharge to ground 16. The greater the high DC voltage $V_{HI}$ in relation to the low DC voltage $V_{LO}$, the greater the benefit of the present invention in reducing the voltage available for inadvertent discharge to system ground 16, up to a maximum reduction of approximately one-half the voltage that would otherwise be available for such inadvertent discharge. This benefit of the invention can be very effective in lowering the chance for, and severity of, any electrical shock or arc attendant to an accidental voltage discharge.

Another benefit of the present invention involves the provision of the switching relays 46 and 48 (or equivalents) to selectively apply the low three-phase AC voltage put out by the generator 22 to the autotransformer 42 only when it is desired to energize the high DC voltage load 40. At all other times, the switching relays 46 and 48 are effective to withhold the low three-phase AC voltage from the autotransformer 42 thereby avoiding the various energy losses that would otherwise be incurred if the autotransformer 42 were continuously energized. This benefit of the invention is particularly advantageous in a motor vehicle electrical system where reduced energy consumption translates into increased vehicle fuel economy. To ease the design requirements of the coils 72 and 76 and the contacts 74a,b,c and 78a,b,c of the relays 46 and 48, conventional electrical design practice dictates that the switching relays 46 and 48 should be located on the high voltage/low current side of the autotransformer 42, which is the output or secondary side of a voltage step-up transformer such as the autotransformer 42. In locating the switching relays 46 and 48 on the input or primary side of autotransformer 42, which is the low voltage/high current side of the autotransformer 42, the present invention runs counter to the foregoing standard electrical design tenet.

A still further benefit of the invention derives from placement of the first and second sets of voltage step-up ratio changing taps 54a,b,c and 56a,b,c on the input or primary side of the phase windings 50a,b,c of the autotransformer 42 rather than the output or secondary side. By employing the tap sets 54a,b,c and 56a,b,c as input or primary taps, the full phase winding 50a,b,c of the autotransformer 42 is utilized as the transformer secondary winding for both voltage step-up ratios. In contrast, if output or secondary taps were employed, less than the full phase winding 50a,b,c would be utilized as the transformer secondary winding for the lower of the two voltage step-up ratios. This is inefficient since the full phase winding 50a,b,c must still be enerized, even when the lower voltage step-up ratio is employed. Moreover, for a given output power rating of the generator 22, output or secondary tapping would require that the autotransformer 42 have more core material and/or winding turns, i.e., be heavier and/or larger, than is otherwise required with the input or primary tapping arrangement of the invention. This is highly disadvantageous in a motor vehicle electrical system where weight and space constraints are severe.

Figure 3A:
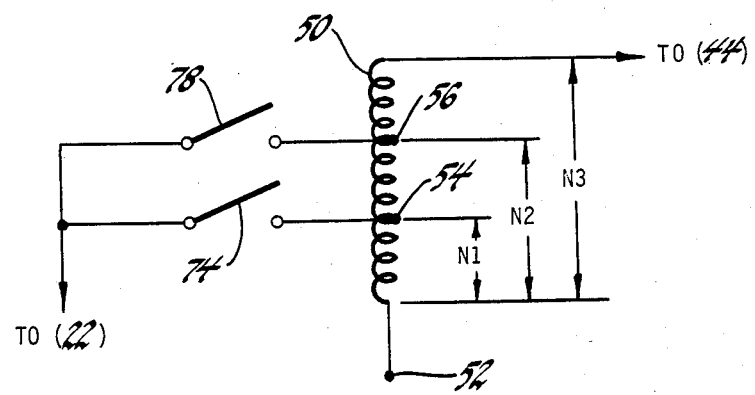
FIGS. 3A and 3B are partial schematic diagrams of transformer tap changing arrangements useful in explaining the principles of the invention.
Figure 3B:
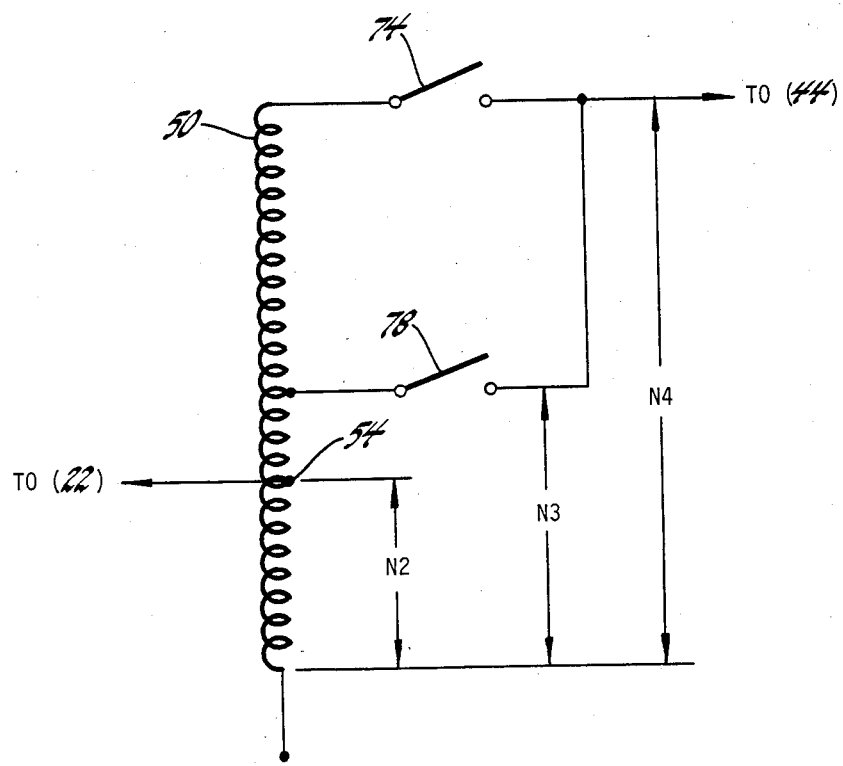

The foregoing advantages of the invention in respect to the particular arrangement of the ratio changing taps 54a,b,c and 56a,b,c of the autotransformer 42 and the switching contacts 74a,b,c and 78a,b,c of the relays 46 and 48 can be best understood by reference to FIGS. 3A and 3B. Specifically, FIG. 3A illustrates the "primary side" transformer tapping and switching arrangement of the invention. For comparison, FIG. 3B illustrates the converse "secondary side" transformer tapping and switching arrangement. In each of FIGS. 3A and 3B, the illustration is confined to a single phase winding 50 of the transformer 42 including high power tap 54 and associated switching contact 74 and low power tap 56 and associated switching contact 78.

Before proceeding to a detailed discussion of FIGS. 3A and 3B, it will be helpful to review some design considerations related to the autotransformer 42 of the invention. The flux level $\phi$ of the autotransformer 42 is given by the expression (1) $\phi = KE/FN$ where K is a constant (approximately equal to $0.225 \times 10^8$), E is the voltage output of the generator 22 which is held constant by the action of the voltage regulator 38, F is the operating frequency of the generator 22 as driven by the vehicle engine 28, and N is the number of primary winding turns in the autotransformer 42. It will be noted from expression (1) that the flux level $\phi$ of the autotransformer 42 is inversely related to the product of the generator frequency F and the number of primary winding turns N. For maximum efficiency, it is desirable that this product be such as to maintain the flux level $\phi$ at a maximum value $\phi m$ which yields an operating point just below the saturation point of the B versus H operating curve of the autotransformer 42, where B is flux per unit area of the transformer core and H is ampere-turns per unit length of the transformer core. Substituting $\phi m$ for $\phi$ in expression (1) yields the expression (2) $\phi m = KE/FN$ and rearranging terms yields the expression (3) $FN = KE/\phi m$ where the quantity $KE/\phi m$ is a constant.

The generator frequency F is determined by the combined power requirement of the high DC voltage load 40 and low DC voltage loads 20 in respect to the frequency versus power output curves of the generator 22. The lowest running frequency of the generator 22 is experienced at the lowest running speed of the vehicle engine 28, which is usually the warmed-up idle speed. If the combined power requirement of the loads 20 and 40 during the high power mode of operation is greater than the power output of the generator 22 at the warmed-up engine idle speed (which will typically be the case), the speed of the engine 28 must be controlled during the high-power mode of operation to drive the generator 22 at a higher frequency at which the generator output power is sufficient to meet the combined power requirement of the loads 20 and 40 during the high power mode of operation, or the generator 22 will be overloaded and the vehicle battery 12 will be discharged. On the other hand, provided that the power output of the generator 22 at the frequency corresponding to the warmed-up engine idle speed is sufficient to meet the combined power requirement of the loads 20 and 40 during the low power mode of operation (which will hopefully be the case), the speed of the engine 28 need not be controlled during the low power mode of operation since any engine speed at or above the warmed-up idle speed will provide adequate output power from the generator 22 and the vehicle battery 12 will not be discharged. If, however, the power required by the loads 20 and 40 during the low power mode of operation is greater than the power output of the generator 22 at the warmed-up engine idle speed, the speed of the engine 28 must be controlled during the low power mode of operation as well or the generator 22 will be overloaded and the vehicle battery 12 will be discharged.

In light of the foregoing, there are two frequencies F of the generator 22 that are of interest in respect to design of the autotransformer 42. The first frequency F1 is the lowest generator frequency required for the high power mode of operation which typically will be greater than the warmed-up idle speed of the engine 28. The second frequency F2 is the lowest frequency suitable for the low power mode of operation, which may be the generator frequency corresponding to the warmed-up idle speed of the engine 28. Likewise, there are two numbers of primary winding turns N for the autotransformer 42 that are of interest. The first turns number N1 is the number of primary winding turns necessary to satisfy expression (3) when the generator frequency is F1. The second turns number N2 is the number of primary winding turns necessary to satisfy expression (3) when the generator frequency is F2.

Substituting F1 and N1 for F and N, respectively, in expression (3) yields the expression (4) $F1N1 = KE/\phi m$.

Similarly, substituting F2 and N2 for F and N in expression (3) yields the expression (5) $F2N2 = KE/\phi m$.

Solving expressions (4) and (5) simultaneously yields the expression (6) $F1N1 = F2N2$ which can be rewritten to yield the expression (7) $N2 = N1(F1/F2)$.

As indicated by expression (7), for maximum efficiency of the autotransformer 42, the second number N2 of primary winding turns required for the low power mode is greater than the first number N1 of primary winding turns required for the high power mode by a factor F1/F2 which is the ratio of the first generator frequency F1 required for the high power mode to the second generator frequency F2 required for the low power mode. While expression (7) is easily satisfied by the "primary side" transformer tapping and switching arrangement shown in FIG. 3A, it cannot be satisfied by the "secondary side" transformer tapping and switching arrangement shown in FIG. 3B.

Referring to the FIG. 3A primary side arrangement, the ratio of primary turns to secondary turns for the high power mode is N1:N3 while the ratio of primary turns to secondary turns for the low power mode is N2:N3 where N3 is the total number of turns in the phase winding 50. By contrast, in the converse secondary side arrangement of FIG. 3B, the ratio of primary turns to secondary turns for the low power mode remains N2:N3, but the ratio of primary turns to secondary turns for the high power mode becomes N2:N4 where N4=N2(N3/N1). Accordingly, assuming the autotransformer 42 has the same cross-sectional core size in each case, the FIG. 3B secondary side arrangement requires N4-N3 more turns in the phase winding 50 than the primary side arrangement of FIG. 3A. This means that, assuming the size of the wire in the winding 50 remains the same in each case, the FIG. 3B arrangement disadvantageously requires a larger autotransformer 42 than the FIG. 3A arrangement. Any attempt to reduce the wire size in the FIG. 3B arrangement would necessarily lead to an undesirable increase in winding resistance and decrease in efficiency. Of course, some reduction in the total number of turns N4 required in the FIG. 3B arrangement could be achieved at the expense of increasing the cross-sectional core size, but the additional core material would disadvantageously increase the weight of the autotransformer 42.

In addition, there is another advantage to the FIG. 3A primary side arrangement over the FIG. 3B secondary side arrangement. Referring to expression (2), it will be noted that for a given number of winding turns N, the maximum flux level $\phi m$ of the autotransformer 42 is inversely proportional to the minimum frequency F of the generator 22, i.e., as the generator minimum frequency F increases, the maximum flux level $\phi m$ required for the autotransformer 42 decreases. This means that the higher the generator frequency F, the less cross-sectional core size and the less core material required in the autotransformer 42. By way of comparing the FIGS. 3A and 3B arrangements in this regard, reference is made to the same N3 number of winding turns utilized in each arrangement. In FIG. 3A, the N3 number of winding turns is utilized for the high power mode at the higher generator frequency F1 and the amount of core material can accordingly be optimized for this high frequency. Conversely, in FIG. 3B, the N3 number of winding turns is utilized for the low power mode only at the low generator frequency F2 and the amount of core material must accordingly be designed for this lower frequency. Therefore, the FIG. 3B arrangement disadvantageously requires more core material in the autotransformer 42 than the FIG. 3A arrangement for the same N3 number of winding turns.

Further, in respect to the FIG. 3B secondary side arrangement, it will be appreciated that the N4-N3 number of turns of the phase winding 50 are not utilized during the low power mode of operation even though they are energized during such mode. This is wasteful and inefficient as compared to the FIG. 3A primary side arrangement where all of the N3 number of turns in the phase winding 50 are fully utilized during both the high and low power modes of operation. Moreover, in the FIG. 3B arrangement, all N4 number of turns in the phase winding 50 are energized at all times, even when the relay contacts 74 and 78 are open. This too is wasteful and inefficient as compared to the FIG. 3A arrangement where the N3 number of turns in the phase winding 50 are energized only when one of the relay contacts 74 or 78 is closed.

In summary, regardless of the basis for comparison, the primary side tapping and switching arrangement of the invention as illustrated in FIG. 3A yields a smaller and/or lighter and more efficiently operated autotransformer 42 than can be achieved with the converse secondary side tapping and switching arrangement as illustrated in FIG. 3B.

A further feature of the invention worthy of note is that the generator 22 is excited from a voltage source independent of the low three-phase AC voltage put out by the generator 22, i.e., the generator 22 is not self-excited. In particular, as previously described, the voltage regulator 38 is of the type that energizes the field winding 26 of the generator 22 with a voltage derived from the vehicle battery 12 as opposed to a voltage derived from the output voltage of the generator 22. This is especially important during any period when the combined power requirement imposed by the high DC voltage load 40 and the low DC voltage loads 20 would, even temporarily, overload the generator 22 by imposing a combined power requirement upon the generator 22 in excess of the power output capability of the generator 22 at whatever speed or frequency the generator 22 is then being driven by the vehicle engine 28.

If under an overload condition of the generator 22, the generator field winding 26 was energized with a voltage derived from the low three-phase AC voltage put out by the generator 22, i.e., if the generator 22 was self-excited, the output voltage of the generator 22 would suffer a degenerative collapse. Specifically, at the onset of the overload condition, the output voltage of the generator 22 would decrease thereby producing a decrease in the voltage energizing the field winding 26 which would further decrease the output voltage of the generator 22 and so on until the output voltage of the generator 22 was fully collapsed. However, with the generator field winding 26 energized from the vehicle battery 12 via the voltage regulator 38, the voltage energizing the field winding 26 is maintained, at least so long as the charge of the battery 12 holds up, and the degenerative collapse of the low three-phase AC voltage put out by the generator 22 is prevented.

While the foregoing feature of the invention is implemented, in a preferred embodiment, by a voltage regulator 38 of the type that energizes the field winding 26 of the generator 22 from the vehicle battery 12, it will be appreciated that the same is not only way in which this feature can be implemented. Other implementations are possible and will be satisfactory so long as the generator field winding 26 is energized with a voltage derived independent of the output voltage of the generator 22 at least during any period that the generator 22 is overloaded. Accordingly, provided that this criterion is met by some suitable apparatus, the voltage regulator 38 could be of the type that otherwise energizes the generator field winding 26 with a voltage derived from the output voltage of the generator 22. Examples of such a voltage regulator are shown in U.S. Pat. Nos. 3,469,168 and 3,597,654 where the voltage for exciting the generator field winding is derived from the generator output voltage via a diode trio.

An additional advantage of the invention resides in the fact that the normal operation of the motor vehicle electrical system 10 to produce the usual low DC voltage between the DC power line 14 and system ground 16 is unaffected by the high DC voltage power supply provided by the invention, i.e., the transformer 42, rectifier 44 and relays 46 and 48 do not interfere with, or have any part in, the generation of the usual low DC voltage. In this way, the efficiency and reliability of the low DC voltage system 10 are not degraded by the high DC voltage power supply of the invention.

Further, as will be explained in more detail hereinafter, the input terminals $54a,b,c$ and $56a,b,c$ and the output terminals $58a,b,c$ of the autotransformer 42 provide convenient portals through which to monitor the AC current flow associated with the autotransformer 42 to obtain an indication of the corresponding DC current flow through the high DC voltage load 40.

III

DUAL MODE WINDSHIELD HEATER CONTROL

In a preferred embodiment, the present invention contemplates that the high DC voltage load 40 may be the resistance element of a motor vehicle windshield heater and the high DC voltage power supply (provided by the autotransformer 42, the rectifier 44 and the switching relays 46 and 48) may be employed to selectively produce maximum and reduced i.e., high and low, heat outputs from the heating element 40 corresponding to deice and defog modes of operation, respectively. In the maximum heat or deice mode of operation, the first relay 46 is energized to render the autotransformer 42 and the rectifier 44 effective to develop the first high DC voltage at a maximum magnitude across the heating element 40 to produce a maximum heat output from the resistance 40 sufficient to remove ice and frost from the exterior surface of the vehicle windshield. In the reduced heat or defog mode of operation, the second relay 48 is energized to render the autotransformer 42 and the rectifier 44 effective to develop the second high DC voltage at a reduced magnitude across the heating element 40 to produce a reduced heat output from the resistance 40 sufficient to remove condensation from the interior surface of the windshield and/or to help prevent the formation of ice or frost on the exterior surface of the windshield.

By way of example, and without any limitation, the resistance of the heater element 40 may be on the order of 3.8 ohms, the maximum power output from the heater element 40 during the deice mode of operation may be on the order of 1500 watts, and the reduced power output from the heater element during the defog mode of operation may be on the order of 400 watts. Under these circumstances, the first high DC voltage of maximum magnitude is on the order of 75 volts while the second high DC voltage of reduce magnitude is on the order of 40 volts. The latter two high DC voltages are substantially greater than the magnitude of the low DC voltage, e.g., nominally fourteen volts, available in the usual motor vehicle electrical system such as that designated by the numeral 10 in FIG. 1.

Where the high DC voltage load 40 is the resistance element of a motor vehicle windshield heater, the invention contemplates a controller 80, as shown in FIG. 4, which consists of appropriate control circuitry 92 and various associated inputs (to be described) providing a sophisticated array of control features as follows:

A. Initiation of the Deice Mode

Pursuant to one feature of the controller 80 of FIG. 4, the control circuitry 92 is operative to initiate the deice mode of operation in response to a vehicle operator actuated deice command, such as depression of momentary deice pushbutton switch 94, provided that the vehicle transmission 96 is in a park or neutral state (i.e., not in one of the drive states) as indicated by an appropriate sensor 98, which may be a switch responsive to the position of the tansmission shift selector 100 such that the sensor switch 98 is closed when the transmission 96 is in the park or neutral state. This latter constrainst is important because the windshield heater element 40 may represent such a large load upon the generator 22 that the addition of other electrical loads incurred under normal driving conditions could overload the generator 22 and lead to discharge of the battery 12. When the deice switch 94 is momentarily depressed, and the transmission sensor switch 98 is closed, the control circuitry 92 is responsive to energize the first relay coil 72 to initiate the deice mode of operation and, at the same time, to also energize a telltale device 102, which may be provided by a light emitting diode, to indicate that the deice mode of operation is in progress. As will be apparent from the foregoing, it is contemplated that the deice mode of operation will normally be initiated by the operator upon starting the vehicle after it has been standing outside for some time in below freezing temperatures and before the vehicle is driven in motion by the operator.

B. Termination of the Deice Mode

As contemplated by another feature of the controller 80 of FIG. 4, the control circuitry 92 is operative to automatically terminate the deice mode of operation a predetermined time period after initiation unless earlier terminated by action of the vehicle operator. The predetermined deice time period should be sufficiently long to satisfactorily clear ice and frost from the exterior surface of the windshield, e.g., two minutes where the maximum power output of the heater element 40 is on the order of 1500 watts. Of course, should the vehicle transmission 96 be shifted by the operator to other than the park or neutral state as detected by the sensor switch 98, the deice mode of operation is immediately terminated. Further, the deice mode of operation is also immediately terminated in response to a vehicle operator actuated off command, such as depression of momentary off pushbutton switch 104. The control circuitry 92 is effective to terminate the deice mode of operation by deenergizing the first relay coil 72, at which time the deice telltale indicator 102 is also deenergized.

C. Initiation of the Defog Mode

According to a further feature of the FIG. 4 controller 80, the control circuitry 92 is operative to initiate the defog mode of operation automatically in response to termination of a preceding deice mode of operation, except where termination of such deice mode was effected by a vehicle operator actuated off command. This defog-after-deice feature keeps the windshield heater element 40 energized at a reduced heat output immediately following the deice mode of operation to prevent the reformation of ice or frost on the exterior of the windshield. Alternately, the control of circuitry 92 is operative to initiate the defog mode of operation in response to a vehicle operator actuated defog command, such as depression of momentary defog pushbutton switch 106. When the defog mode of operation is called for, either in response to termination of a preceding deice mode of operation or depression of the defog switch 106, the control circuitry 92 is responsive to energize the second relay coil 76 to initiate the defog mode of operation and, at the same time, to also energize a telltale device 108, which may be provided by a light emitting diode, to indicate that the defog mode of operation is in progress.

D. Termination of the Defog Mode

In yet another feature of the FIG. 4 controller 80, the control circuitry 92 is operative to automatically terminate the defog mode of operation a predetermined time period after initiation, provided that such initiation was in response to termination of an immediately preceding deice mode of operation. The predetermined defog time period should be sufficiently long to satisfactorily keep ice and frost from reforming on the exterior of the windshield until the usual hot air type windshield defroster and/or interior space heater of the vehicle have warmed up to a temperature effective to perform this function, i.e., ten minutes. Where initiation of the defog mode was effected by a vehicle operator actuated defog command, i.e., depression of momentary defog pushbutton switch 106, the defog mode of operation is permitted to continue indefinitely until terminated in response to an operator actuated off command, i.e., depression of momentary off pushbutton switch 104. Thus, if desired, the defog mode of operation can be utilized as a substituted for the usual hot air type windshield defroster, thereby eliminating the ductwork, blower motor, etc. normally associated with the latter. The control circuitry 92 is effective to terminate the defog mode of operation by deenergizing the second relay 76, at which time the defog telltale indicator 108 is also deenergized.

E. Fast Idle Command

Pursuant to another feature of the controller 80 of FIG. 4, the control circuitry 92 is responsive to initiation of the deice mode of operation to issue a fast idle command to the vehicle engine 28 via line 110 to raise the engine idle speed (and torque) above the normal idle speed (and torque) to ensure that the motive power provided by the engine 28 is great enough to drive the generator 22 at the speed or frequency required to produce the necessary electrical power for the deice mode of operation. In the absence of this feature, the vehicle battery 12 could become undesirably discharged during the deice mode of operation, particularly where the size of the autotransformer 42 has been kept to the minimum necessary to provide sufficient power to satisfy the defog mode of operation when the vehicle engine 28 driving the generator 22 is running at idle speed. Preferably, the operation of the vehicle engine 28 is governed by an electronic controller (not separately shown) of known type having apparatus for raising the idle speed of the engine 28 in response to receipt of a fast idle command from the control circuitry 92. Alternately, the engine 28 could be specifically equipped with a suitable actuator to perform this function.

F. Overheated Windshield Shut-Off

In a still further feature of the FIG. 4 controller 80, the control circuitry 92 is operative to prohibit further energization of the windshield heater element 40 in response to overheating of the vehicle windshield as is detected by a heat sensor 112 which may be a thermistor located in or on the windshield. Such overheating, which might result in damage to the windshield, could occur is either the deice or defog mode of operation is inadvertently initiated in warm weather. When the windshield temperature, as measured by the sensor 112, reaches or exceeds a specified upper limit, e.g. 100 degrees Fahrenheit, the control circuitry 92 acts to immediately deenergize the energized one of the relays 46 and 48 thereby terminating whichever one of the deice and defog modes of operation happens to then be in progress.

G. Low Battery Voltage and Ignition Shut-Off

As contemplated by yet another feature of the FIG. 4 controller 80, the control circuitry 92 senses the voltage of the vehicle battery 12 appearing between lines 114 and 116 and prohibits further energization of the windshield heater element 40, by deenergizing the energized one of the relays 46 and 48, it the battery voltage drops below a specified lower limit, e.g. eleven volts. This feature prevents the battery 12 from becoming inordinately discharged by operation of the windshield heater element 40. It will be noted that the lines 114 and 116 are electrically equivalent to the line 14 and ground 16 shown in FIG. 1.

Further, it will be appreciated that the control circuitry 92 is deenergized, thereby deenergizing the relays 46 and 48 and prohibiting further energization of the windshield heater element 40, whenever the ignition switch contacts 18 are opened, i.e., when the vehicle ignition switch is shut off by the vehicle operator.

H. Abnormal Load Current Shut-Off

In a still further feature of the controller 80 of FIG. 4 (and of the high DC voltage power sypply of FIG. 1) a current transformer 118 senses the current flowing through one of the output terminals 58a, 58b and 58c of the autotransformer 42. As an alternative, the current transformer 118 could be applied to sense the current flow through one of the input terminals 54a, 54b and 54c or 56a, 56b and 56c of the autotransformer 42. Preferably, as shown, the current transformer 118 includes a core 120 looped around a lead wire 122 connected to the output terminal 58a of the autotransformer 42 such that the lead 122 forms the primary winding of the transformer 118. A secondary winding 124 is wound around core 120 and connected to the control circuitry 92. While the current transformer 118 is preferred, other forms of current detection could be employed instead.

It will be appreciated that the AC current flowing through the autotransformer output lead 122 is related to, and indicative of, the DC current flowing through the load resistance 40 (the DC load current is derived from the AC transformer current). If the windshield should become cracked, causing an open circuit condition through all or part of the resistance element 40, the DC load current through the heater element 40 will fall abnormally low thereby causing the AC current flow through the lead 122 to be likewise abnormally low. Under some circumstances, a cracked windshield condition could result in arcing if the heater resistance 40 remains energized. Accordingly, in the event of abnormally low AC transformer current, it is desirable that energization of the windshield heater system be immediately terminated. To this end, the control circuitry 92 monitors the current flow through the autotransformer lead 122 via the secondary winding 124 and core 120 of the transformer 118 and deenergizes the relays 46 and 48 whenever this current flow is below a lower limit indicative of an abnormally low DC current flow in the windshield heater element 40.

As will be readily apparent to those skilled in the art, the control circuitry 92 for providing the previously described control features may take a variety of well-known forms. For example, the circuitry 92 may be implemented using logic devices such as AND gates, OR gates, flip-flops, monostable multivibrators, inverters, comparators, latch devices and the like, all as well understood in the art. Alternately, the circuitry 92 can be implemented by a suitably programmed digital computer together with appropriate peripheral devices. Other suitable forms of the circuitry 92 will also be apparent to the skilled artisan. The present invention is not limited to any particular implementation of the control circuitry 92.

IV

DIGITAL COMPUTER IMPLEMENTATION

Figure 5:
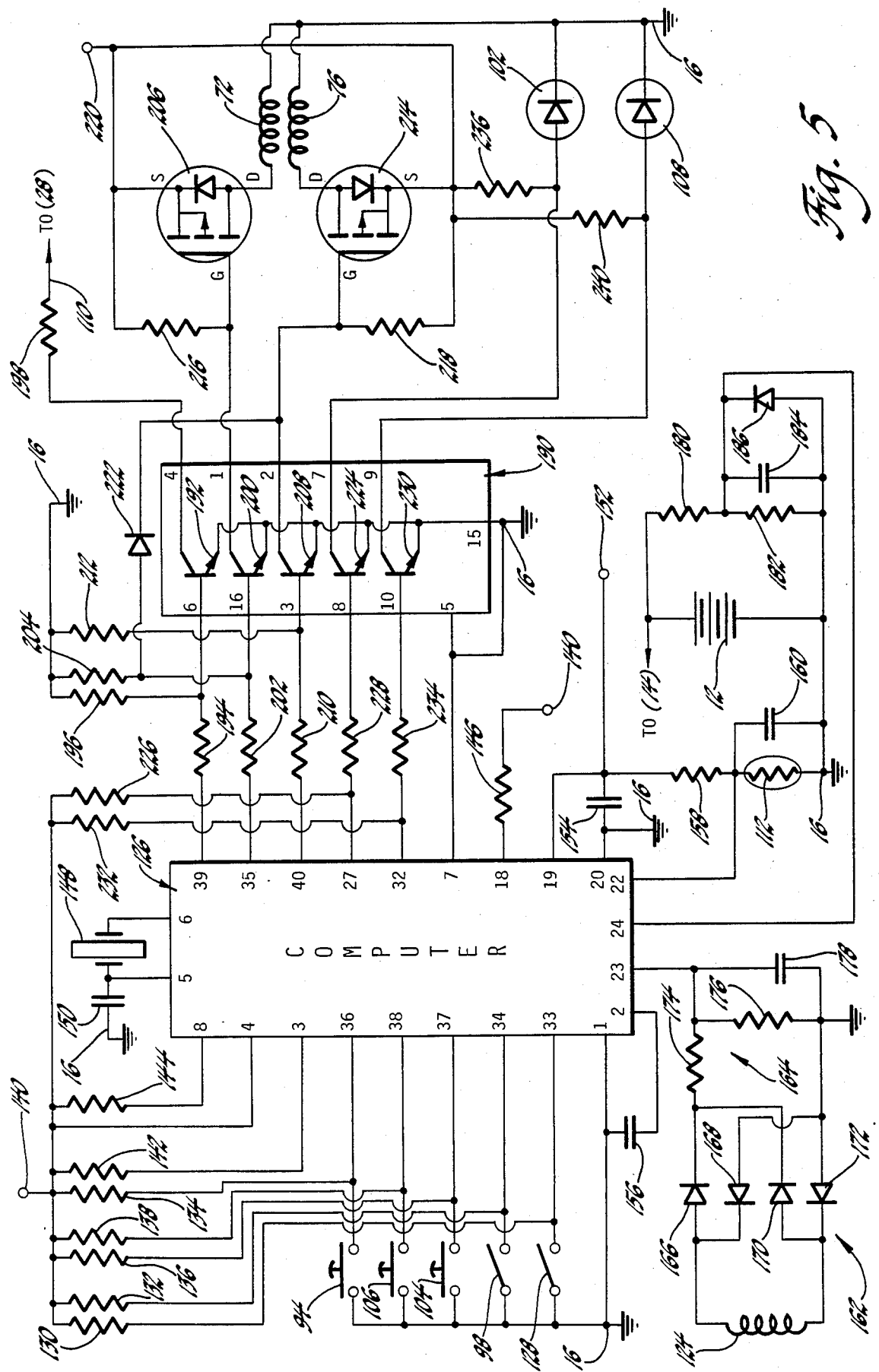
FIG. 5 is a schematic diagram depicting a digital computer implementation of a dual mode heted windshield control in accordance with the principles of the invention and featuring three operator actuated input switches.

Preferably, the control circuitry 92 shown in FIG. 4 is implemented by a digital computer apparatus as shown in FIG. 5 where like numerals are used to denote like elements. Referring to FIG. 5, the digital computer 126 may be, for example, a Motorola Model No. MC6805R2 microcomputer commercially available from Motorola, Inc., as described in Motorola publication: "Advance Information, MC68(7)05R/U Series 8-Bit Microcomputers," pages 3-298 to 3-389. The latter publication is available upon request from Motorola, Inc., or from the assignee of this application. However, it is to be understood that the computer 126 can be implemented by any suitable digital computer.

Assuming that the computer 126 is a Motorola MC6805R2 microcomputer, the associated circuitry necessary and/or desirable to implement the invention is shown in FIG. 5. Pins 33, 34, 36, 37 and 38 of the computer 126 are discrete inputs to the input/output unit of the computer 126. In particular, the deice pushbutton 94 is connected between ground 16 and pin 36 of the computer 126. The defog pushbutton 106 is connected between ground 16 and pin 38 of the computer 126. The off pushbutton 104 is connected between ground 16 and pin 37 of the computer 126. The vehicle transmission sensor switch 98 is connected between ground 16 and pin 34 of the computer 126. Further, a bypass switch 128 (not previously described, but to be described hereinafter) is connected between ground 16 and pin 33 of the computer 126. Pull-up resistors 130, 132, 134, 136 and 138 are each connected between a six volt source 140 and the pins 33, 34, 36, 37 and 38, respectively. In operation, the potential at pins 33, 34, 36, 37 and 38 is shifted to ground when the associated one of the switches 94, 98, 104, 106 or 128 is closed and is otherwise maintained at the six volt potential of source 140 via resistors 130, 132, 134, 136 and 138 when the associated one of the switches, 94, 98, 104, 106 and 128 is open.

Additionally, the voltage source 140 is connected directly to pin 4 and indirectly to pins 3, 8 and 18 of the computer 126 through resistors 142, 144 and 146 respectively. A clock reference for the computer 126 is provided by a 4 MHz cyrstal 148 connected between pins 5 and 6, and a capacitor 150 conected between pin 5 and ground 16. A five volt source 152 is connected directly to pin 19. Pins 1, 7 and 20 are connected directly to ground 16. Capacitor 154 is connected between pins 19 and 20. Capacitor 156 is connected between pins 1 and 2.

Pins 22, 23 and 24 of the computer 126 are analog voltage inputs to the analog to digital converter unit of the computer 126. Specifically, pin 22 is connected to the junction between a pair of voltage divider resistors 112 and 158 connected in series between the five volt source 152 and ground 16 where the resistor 112 is the windshield temperature sensing thermister. Noise and transient filtering is provided by capacitor 160 and which is connected between pin 22 and ground 16. Accordingly, the windshield temperature sensor input appears as an analog voltage at pin 22 of the computer 126.

The secondary winding 124 of the windshield crack detector transformer 118 is connected via full-wave bridge rectifier 162 and voltage divider/filter 164 to pin 23 of the computer 126. The rectifier 162 is provided by diodes 166, 168, 170 and 172. The voltage divider/filter 164 is provided by resistors 174 and 176 and by capacitor 178. In particular, pin 23 is connected to the junction between the resistors 174 and 176 which are connected in series between the positive terminal of the bridge rectifier 162 and the negative terminal of the rectifier 162 which is connected to ground 16. Noise and transient filtering capacitor 178 is connected between pin 23 and ground 16. In operation, the AC voltage developed across the secondary winding 124 of the windshield crack detector transformer 118 is full-wave rectified by the bridge rectifier 162 to provided a DC voltage which is divided by the resistors 174 and 176 and applied to pin 23 of the computer 126 as the windshield crack detector input.

Pin 24 of the computer 126 is connected to the junction between a pair of voltage divider resistors 180 and 182 which are connected in series across the vehicle battery 12. Noise and transient filtering is provided by capacitor 184 connected between pin 24 and ground 16. Reverse polarity voltage protection is provided by diode 186 connected between pin 24 and ground 16. Thus, an analog voltage proportioned to the vehicle battery voltage appears at pin 24 of the computer 126.

Pins 27, 32, 35, 39 and 40 of the computer 126 are discrete outputs from the input/output unit of the computer 126. Each discrete output is buffered through an NPN junction transistor connected in a common emitter configuration and provided as part of an integrated circuit buffer module 190 which may be a CA3081 as commercially available from RCA Corporation.

Pin 39 of the computer 126 is the fast idle discrete output. When the potential at pin 39 is low, NPN transistor 192 in the buffer module 190 is turned off through the biasing action of resistors 194 and 196 to send a fast idle command signal (high potential) to the vehicle engine 28 via resistor 198 and line 110.

Pins 35 and 40 of the computer 126 are the deice and defog relay outputs, respectively. When the potential at pin 35 is high, NPN transistor 200 in the buffer module 190 is turned on through the biasing action of resistors 202 and 204 to turn on MOSFET driver transistor 206 to energize deice relay coil 72. Similarly, when the potential at pin 40 is high, NPN transistor 208 in the buffer module 190 is turned on through the biasing action of resistors 210 and 212 to turn on MOSFET driver transistor 214 to energize defog relay coil 76. MOSFET driver transistors 206 and 214 may, for example, be IRF9511 P-channel devices available from International Rectifier, Inc. Biasing resistors 216 and 218 are connected between a nominal twelve volt source 220 (which may be derived from the load side of the vehicle ignition switch 18) and the gates of the MOSFET driver transistors 206 and 214, respectively, to keep the driver transistors 206 and 214 turned off at all times other than when the NPN transistors 200 and 208 are turned on. Diode 222 is connected from the base of NPN transistor 200 to the collector of NPN transistor 208 as an interlock to ensure that if the potential at pins 35 and 40 should be high at the same time, transistor 208 will turn on and transistor 200 will turn off thereby making the defog mode of operation the default mode of the system.

Pins 27 and 32 of the computer 126 are the deice and defog indicator outputs, respectively. In the stand-by condition, NPN transistor 224 in buffer module 190 is turned on through the biasing action of resistors 226 and 228 to keep deice telltale indicator 102 deenergized. Similarly, in the stand-by condition, NPN transistor 230 in buffer module 190 is turned on through the biasing action of resistors 232 and 234 to keep defog telltale indicator 108 deenergized. When the potential at pin 27 of the computer 126 is low (during the deice mode), transistor 224 turns off thereby permitting deice telltale indicator 102 to be energized through resistor 236 which is connected to voltage source 220. In like manner, when the potential at pin 32 is low (during the defog mode), transistor 230 is turned off thereby permitting defog telltale indictor 108 to be energized through resistor 240 which is connected to voltage source 220.

Figure 6:
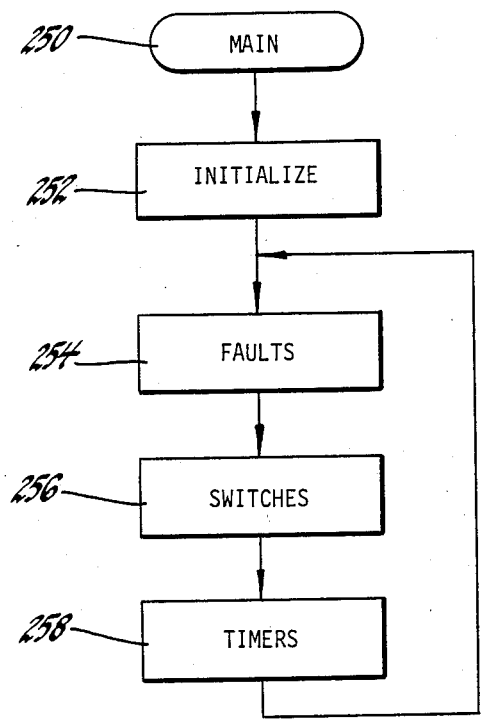
Figure 7:
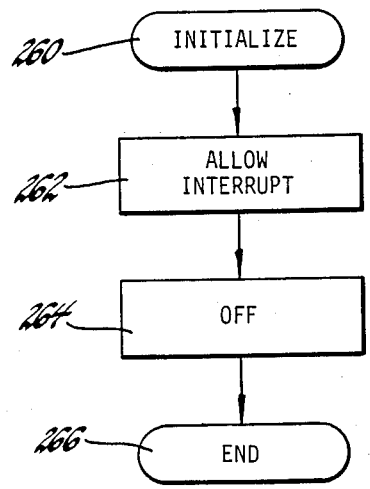
Figure 8:
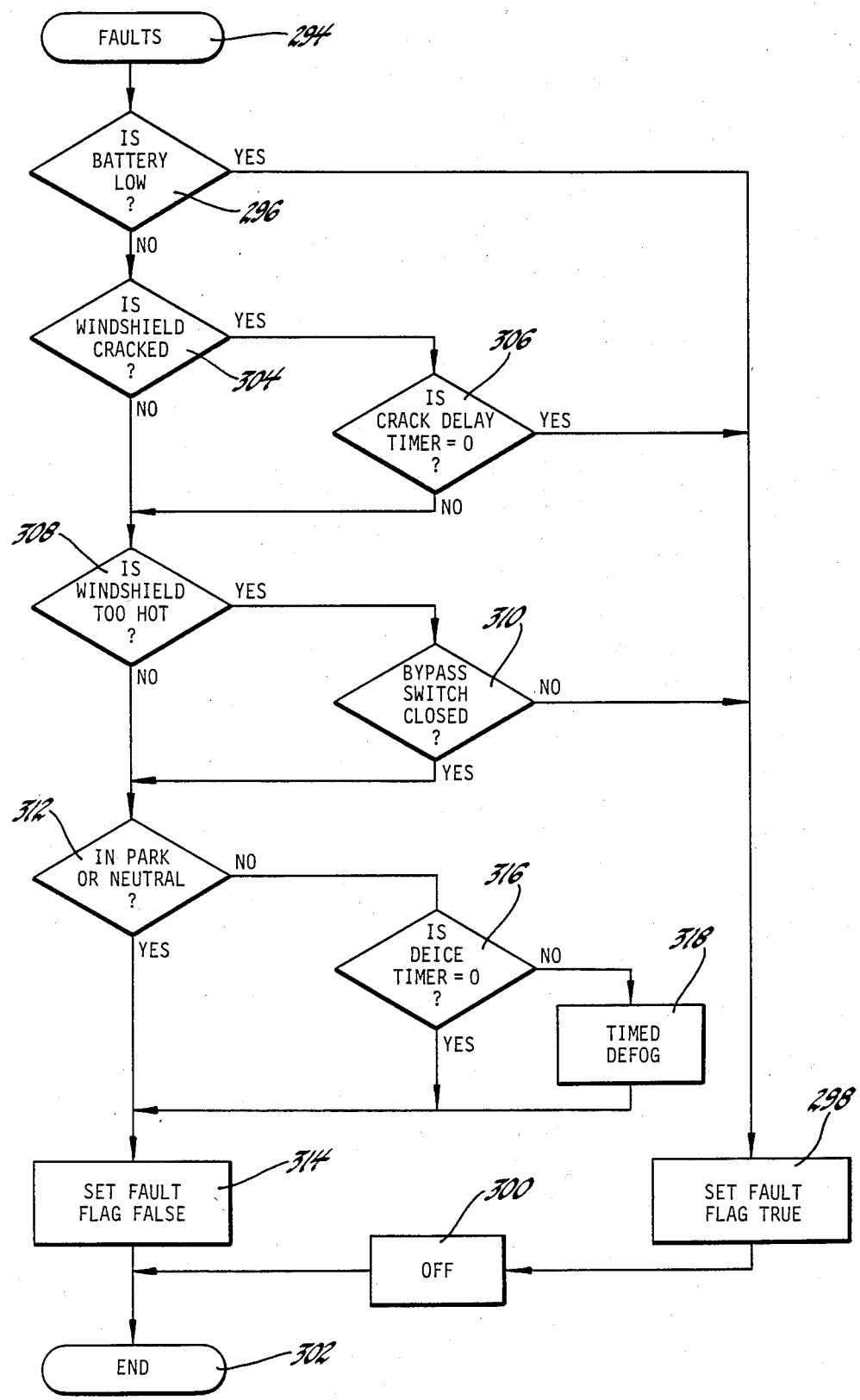
Figure 9:
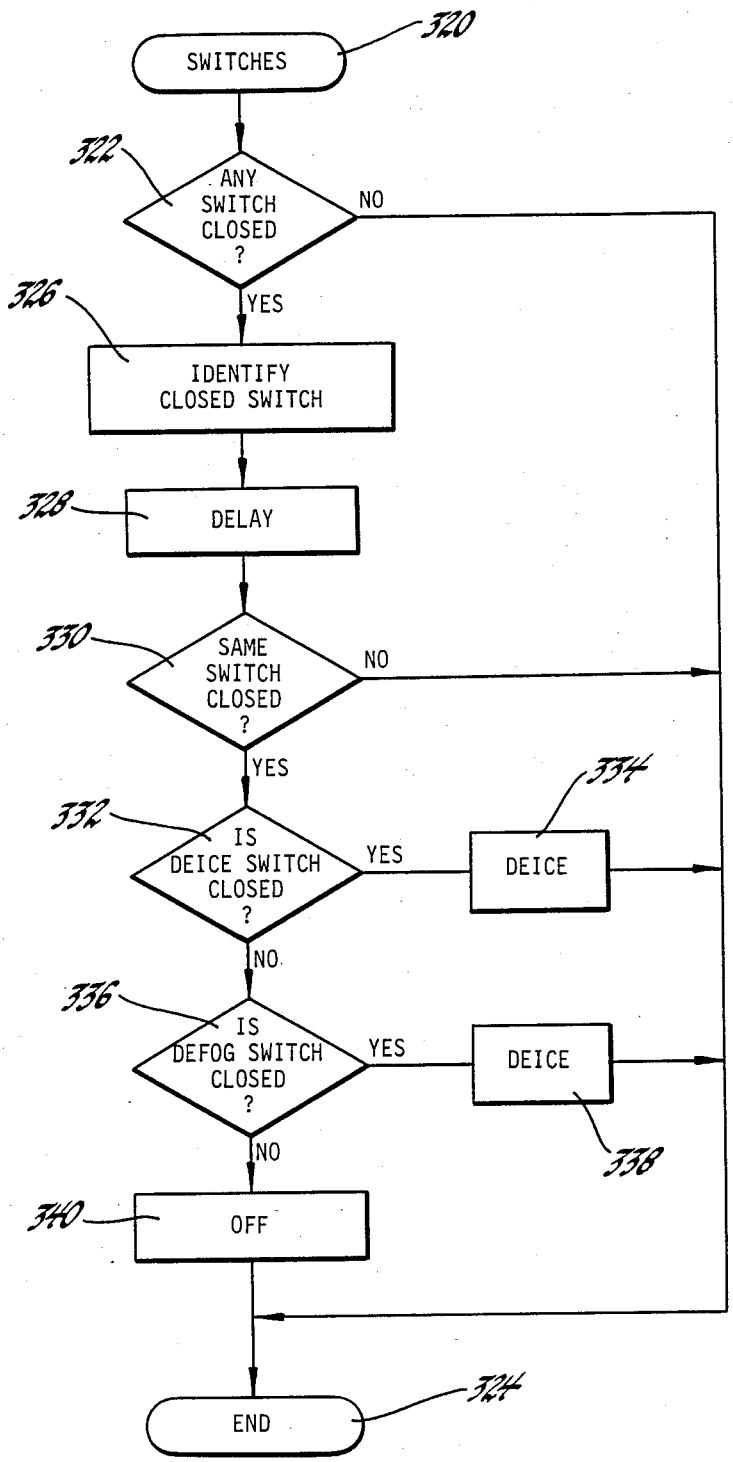
Figure 10:
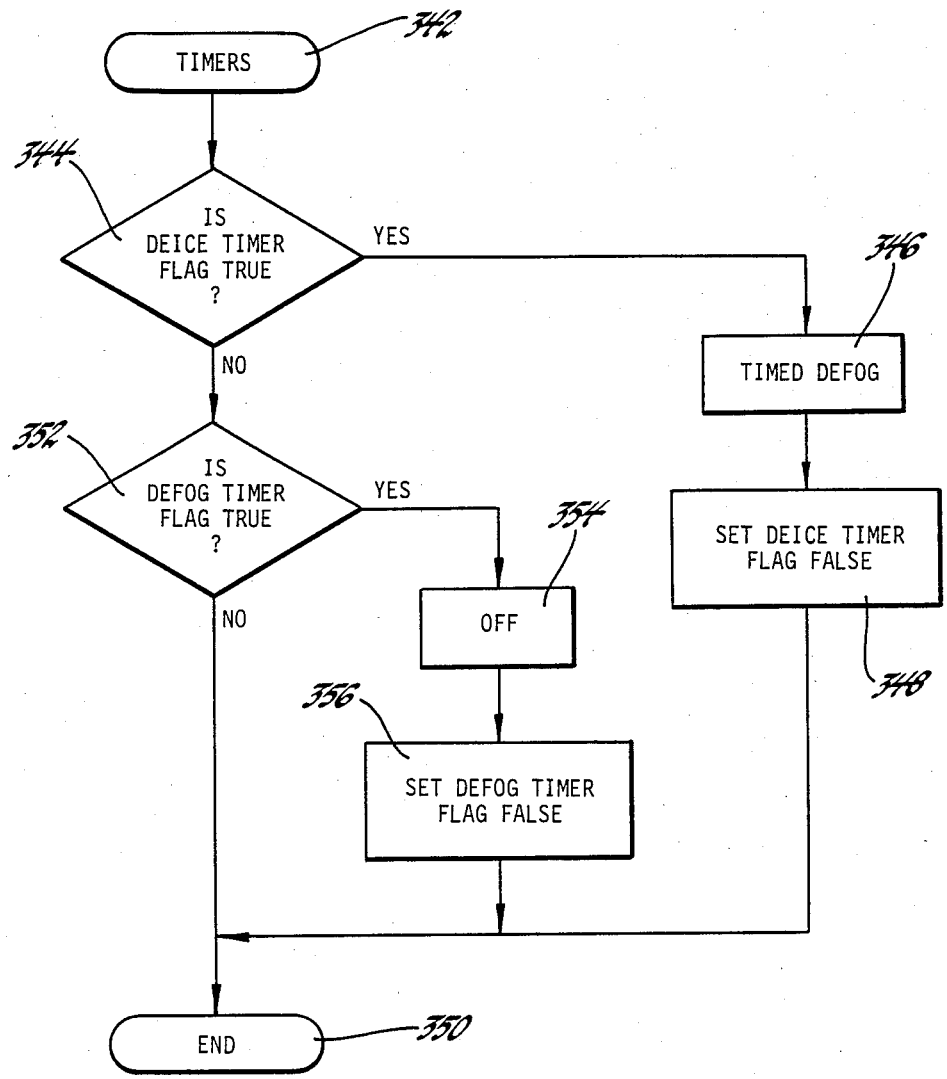

The digital computer 126 shown in FIG. 5 is operated in accordance with a program embodied within a set of flow charts illustrated in FIGS. 6–17. Referring to FIG. 6, the main program is initiated at point 250 when power is first applied to the computer 126, e.g., when ignition switch 18 is closed. Following power up, the program proceeds to an initialize step 252 where an initialize routine is executed as shown in FIG. 7. Thereafter the main program recirculates continuously through a loop consisting of a faults step 254 at which a faults routine is performed as shown in FIG. 8, a switches step 256 at which a switches routine is performed as shown in FIG. 9, and a timers step 258 at which a timers routine is performed as shown in FIG. 10. The latter three steps 254, 256 and 258 are repeatedly executed in series so long as the computer 126 is powered up.

Figure 11:
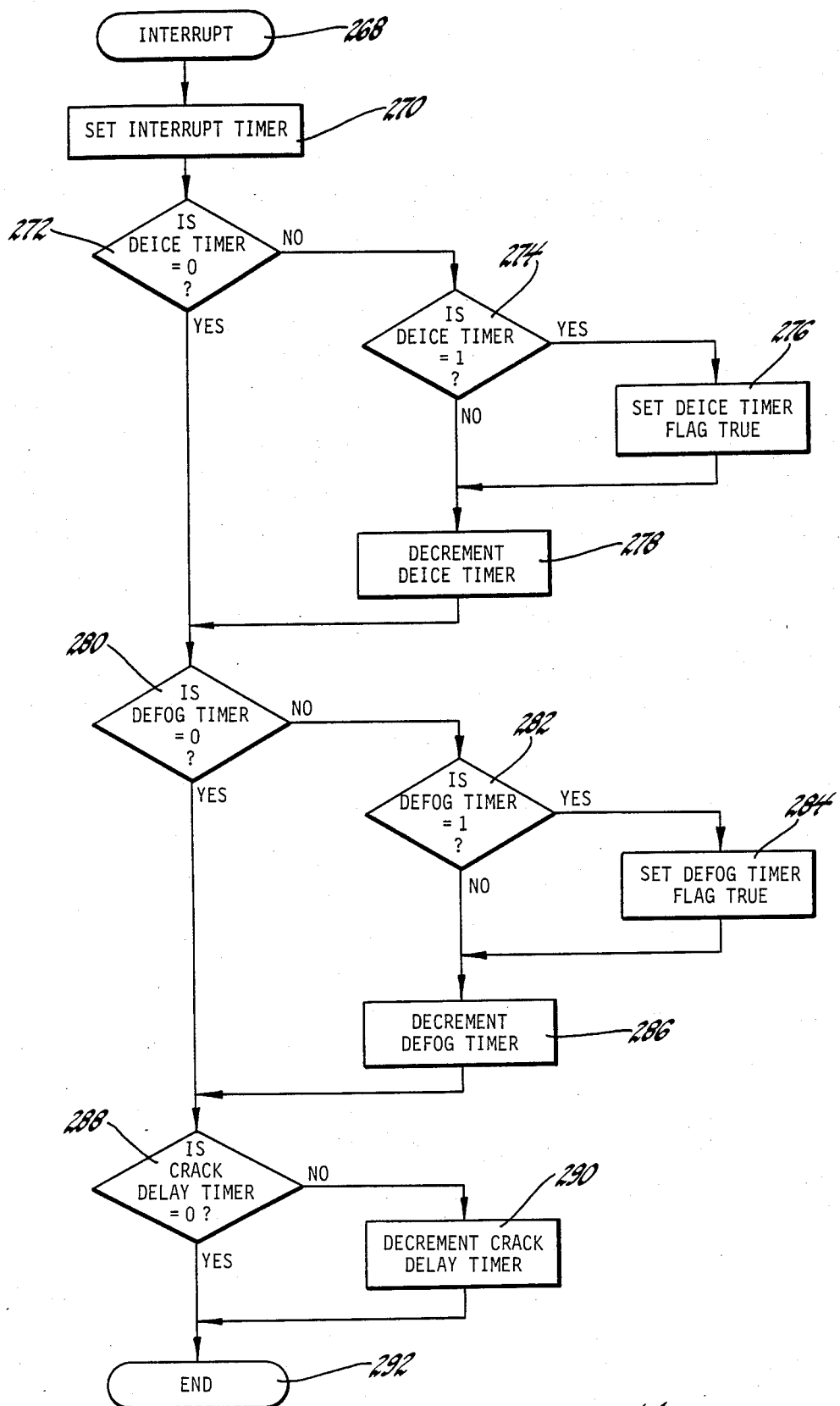
Figure 12:
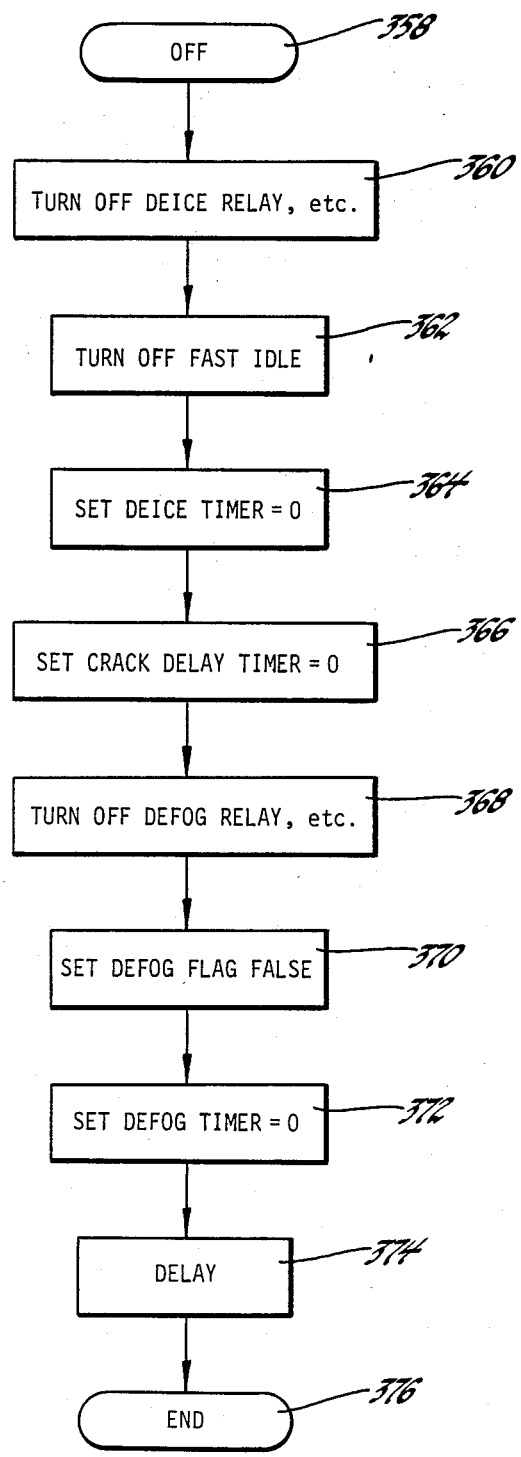

Referring to FIG. 7, the initialize routine begins at point 260 and proceeds to an allow interrupt step 262 at which the internal interrupt timer in the central processing unit of the computer 126 is set and after which such timer repeatedly calls an interrupt routine as shown in FIG. 11, e.g., every 25 milliseconds. Following the allow interrupt step 262, the initialize routine proceeds to an off step 264 at which an off routine is executed as shown in FIG. 12. Thereafter, the initialize routine proceeds to an end point 266 at which the routine is terminated.

Referring to FIG. 11, the interrupt routine establishes and operates the three timers utilized by the dual mode heated windshield control: a deice timer for timing the deice mode of operation, a defog timer for timing the timed defog mode of operation, and a crack detector delay timer for timing a delay following initial energization of the generator 22 before any cracked windshield indication is interpreted as valid. The latter delay permits the voltage regulator 38 to gradually bring the low three-phase AC voltage output of the generator 22 up to its full operating value sufficiently slowly that the increased load on the engine 28 is not noticeable to the vehicle operator. A typical value for this crack detector delay period may be approximately three seconds. As previously described, typical values for the timed deice and defog modes of operation may be two minutes and ten minutes, respectively.

The interrupt routine of FIG. 11 begins at point 268 and proceeds to a set interrupt timer step 270 at which the interrupt timer in the central processing unit of the computer 126 is set. The routine then proceeds to a decision step 272 at which the computer 126 determines whether the count in the deice timer is zero, meaning that the timer is inactive. If decision 272 is no, the program proceeds to a decision step 274 at which the computer 126 determines whether the count in the deice timer is one. If decision 274 is yes, a deice timer flag is set true at step 276 and the routine proceeds to a decrement deice timer step 278. If decision step 274 is no, the program immediately proceeds to the decrement deice timer step 278. At step 278, the deice timer is decremented one count and the routine then moves on to step 280. Similarly, if decision 272 is yes, the interrupt routine proceeds immediately to step 280.

At decision step 280 of the interrupt routine, the computer 126 determines whether the count in the defog timer is zero, meaning that the timer is inactive. If decision 280 is no, the program proceeds to a decision step 282 at which the computer 126 determines whether the count in the defog timer is one. If decision 282 is yes, a defog timer flag is set true at step 284 and the routine proceeds to a decrement defog timer step 286. If the decision step 282 is no, the program immediately proceeds to the decrement defog timer step 286. At step 286, the defog timer is decremented one count and the routine then moves on to step 288. Likewise, if decision is 280 is yes, the interrupt routine proceeds immediately to step 288.

At decision step 288 of the interrupt routine, the computer 126 determines whether the count in the crack detector delay timer is zero, meaning that the timer is inactive. If decision 288 is no, the program proceeds to timer step 290. At step 290, the crack detector delay timer is decremented one count and the interrupt routine then proceeds to an end point 292 at which the routine is terminated. Similarly, if decision 288 is yes, the routine proceeds immediately to the end point 292.

Referring to FIG. 8, the faults routine checks the heated windshield system for any problems or faults. The faults routine begins at point 294 and proceeds to a decision step 296 at which the computer 126 determines whether the battery voltage input at pin 24 indicates that the voltage of the battery 12 is below a lower limit, e.g., below eleven volts. If decision 296 is yes, a fault flag is set true at step 298 and the faults routine proceeds to an off step 300 where an off routine is performed as shown in FIG. 12. Following execution of the step 300 off routine, the faults routine then proceeds to an end point 302 at which the routine is terminated.

If decision 296 is no, the faults routine moves on to a decision step 304 at which the computer 126 determines whether the crack detector input at pin 23 indicates that the windshield is cracked. If decision 304 is yes, the program proceeds to a decision step 306 at which the computer 126 determines whether the count in the crack detector delay timer is zero, meaning that the timer is inactive or timed out. If decision 306 is yes, the fault flag is set true at step 298 and the routine proceeds through steps 300 and 302 as previously described. If decision 306 is no, the faults routine moves on to step 308. Similarly, if decision 304 is no, the faults routine proceeds immediately to step 308.

At decision step 308 of the faults routine, the computer 126 determines whether the windshield temperature input at pin 22 indicates that the windshield temperature is above an upper limit, e.g., above 100° F. If decision 308 is yes, the program proceeds to a decision step 310 at which the computer 126 determines whether the manually operable bypass switch 128 is closed, i.e., whether pin 33 is at ground. The switch 128 permits the windshield temperature input at pin 22 to be bypassed during manufacturing and maintenance operations. If decision 310 is no, the fault flag is set true at step 298 and the program proceeds through steps 300 and 302 as previously described. If the decision 310 is yes, the program moves to a decision step 312. Likewise, if decision 308 is no, the faults routine proceeds immediately to step 312.

Figure 13:
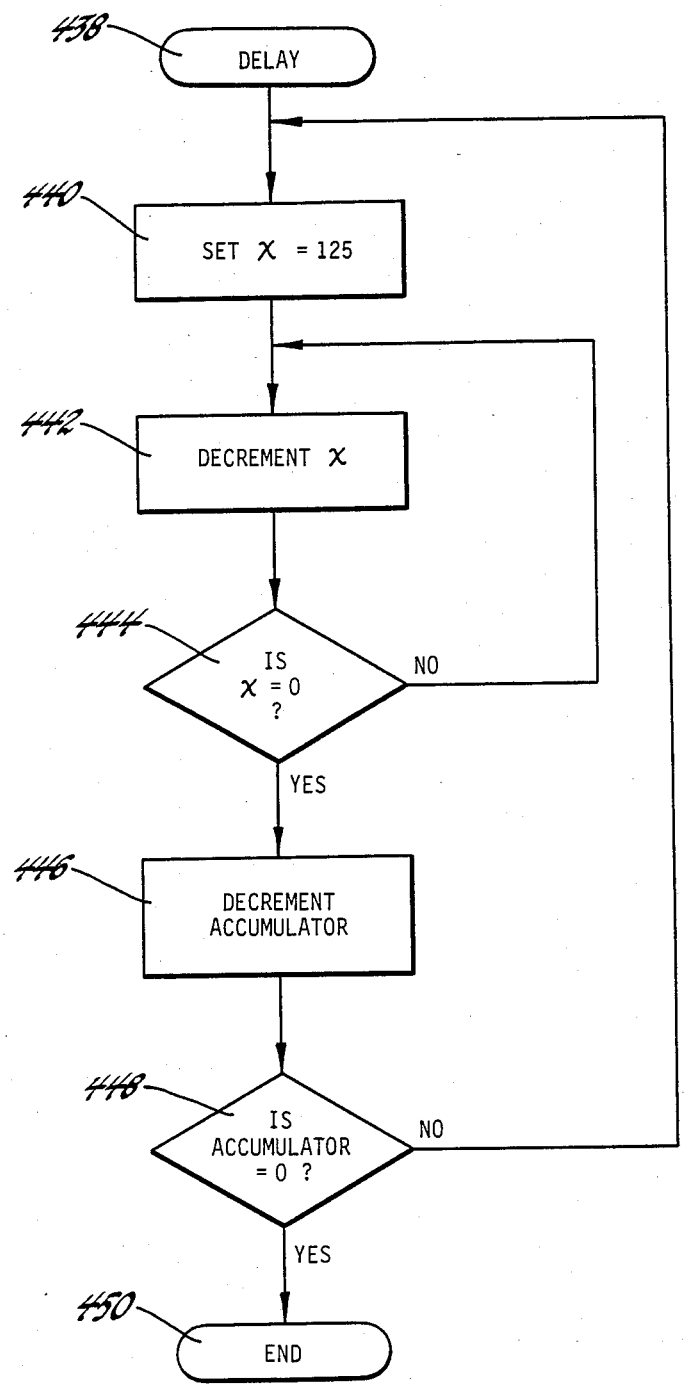

At decision step 312 of the faults routine, the computer 126 determines whether pin 34 is at ground potential indicating that transmission sensor switch 98 is closed because the vehicle transmission 96 is in the park or neutral condition. If decision 312 is yes, the fault flag is set false at step 314 and the fault routine proceeds to the end point 302. If decision 312 is no, the program proceeds to decision step 316 at which the computer 126 determines whether the count in the deice timer is zero. If decision 316 is yes, the program proceeds through steps 314 and 302 as previously described. If decision 316 is no, the program proceeds to step 318 at which a timed defog routine is executed as shown in FIG. 13, and then the faults routine proceeds through steps 314 and 302 as previously described.

Referring to FIG. 9, the switches routine monitors the condition of the dice, defog and off pushbutton switches 94, 104 and 106. The switches routine begins at point 320 and proceeds to a decision step 322 at which the computer 126 determines whether any of the switches 94, 104 or 106 is closed as indicated by the potential at pins 36, 38 and 37, respectively. If decision 322 is no, the switches routine proceeds immediately to an end point 324 at which the routine is terminated. If decision 322 is yes, the program proceeds to step 326 at which the identity of the closed one of the switches 94, 104 and 106 is saved in memory. Thereafter, the program proceeds to step 328 at which the delay routine as shown in FIG. 13 is executed. Following the step 328 delay, the switches routine proceeds to decision step 330 at which the computer 126 determines whether the previously identified one of the switches 94, 104 and 106 is still closed as indicated by the potential at the appropriate one of the pins 36, 38 and 37. The step 328 delay, which may be on the order of 10 milliseconds, provides for clearance of a false "switch closed" indication due to noise, switch contact bounce, or some other transient condition.

Figure 14:
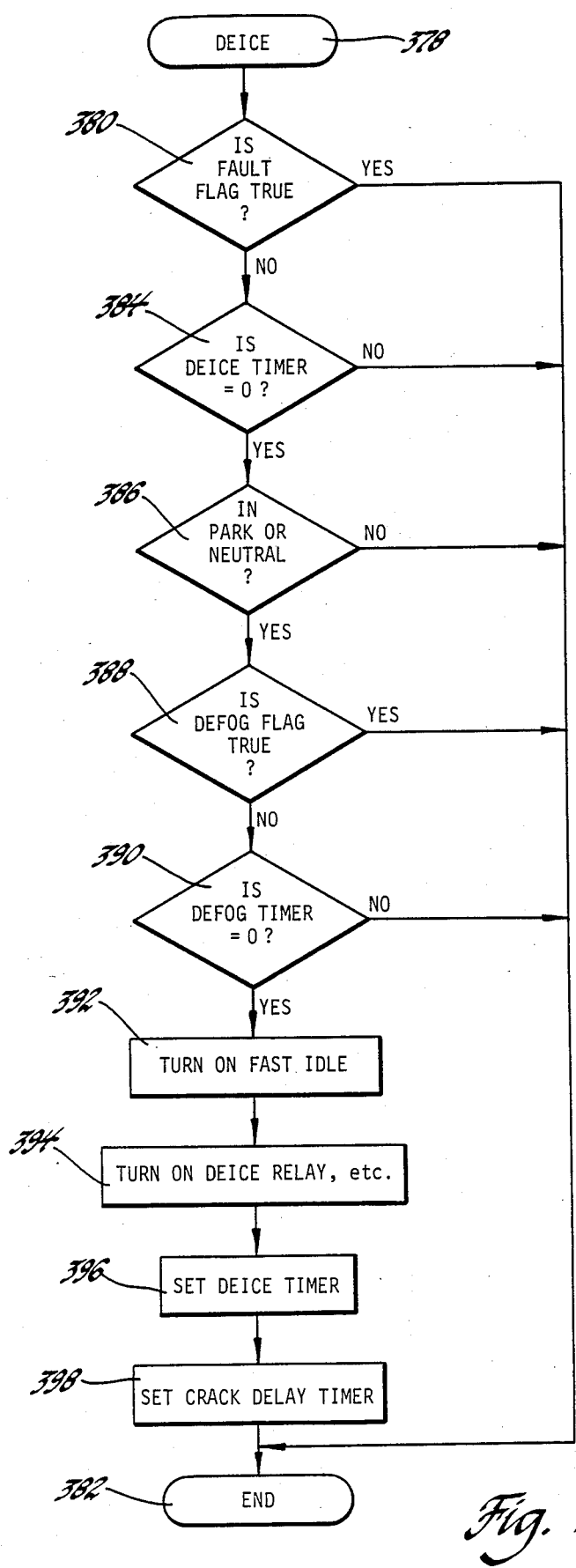
Figure 15:
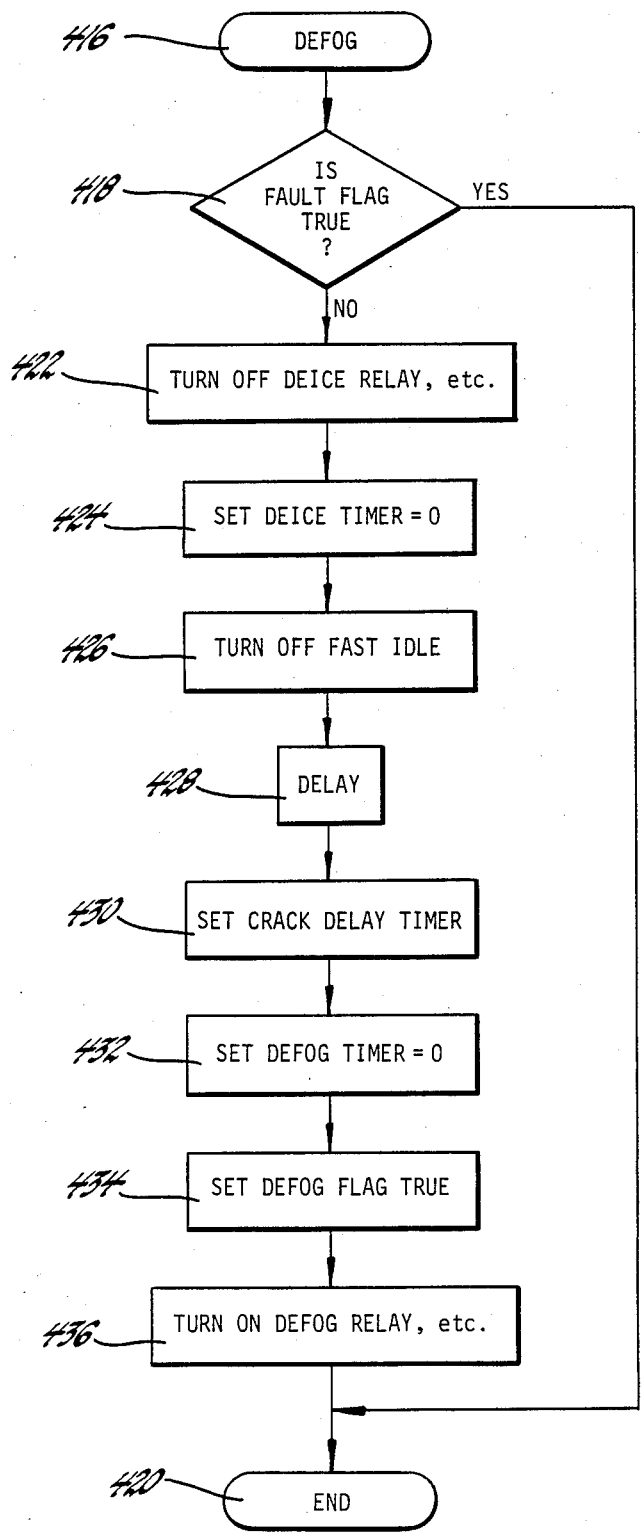

If decision 330 is no, the switches routine proceeds directly to the end point 324. If decision 330 is yes, the program proceeds to decision step 332 at which the computer 126 compares the read switch number with a stored number indicative of the deice switch 94 to determine whether the closed switch is the deice switch 94. If decision 332 is yes, the switches routine moves to step 334 at which a timed deice routine is executed as shown in FIG. 14 and then the program proceeds to the end point 324. If decision 332 is no, the program proceeds to decision step 336 at which the computer 126 compares the read switch number with a stored number indicative of the defog switch 106 to determine whether the closed switch is the defog switch 106. If decision 336 is yes, the program proceeds to step 338 where a continuous defog routine is executed as shown in FIG. 15 and then the program proceeds to the end point 324. If decision 336 is no, (indicating that multiple switches are closed), the program proceeds to step 340 where an off routine is executed as shown in FIG. 12, and then the switches routine proceeds to the end point 324.

Figure 16:
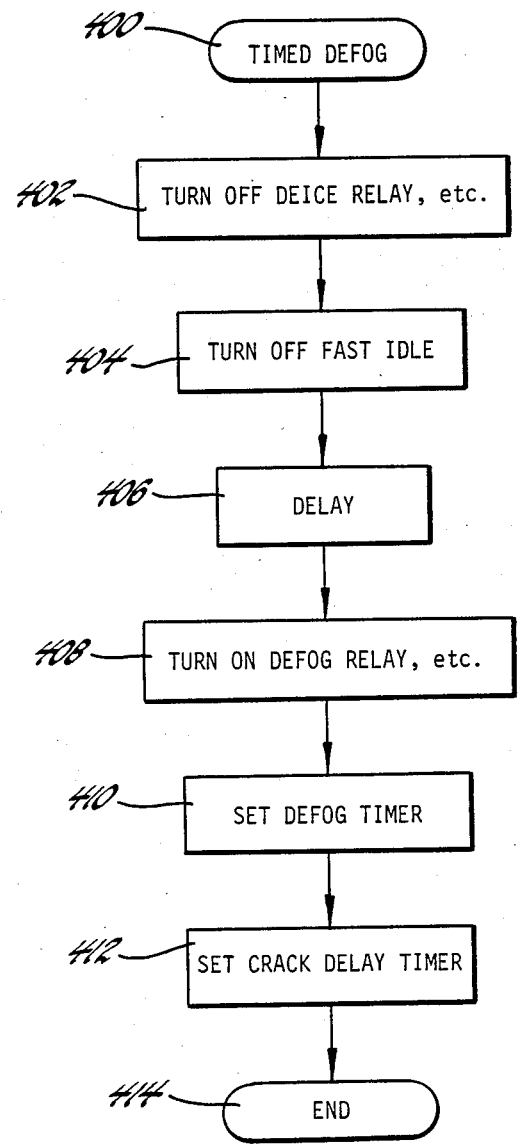

Referring to FIG. 10, the timers routine monitors the system timers. The timers routine begins at point 342 and proceeds directly to decision step 344 at which the computer 126 determines whether the deice timer flag is true. If decision 344 is yes, the program moves to step 346 where a timed defog routine is executed as shown in FIG. 16. Following the step 346 timed defog routine, the timers routine resumes at step 348 where the deice timer flag is set false, and then the timers routine proceeds to an end point 350 at which the routine is terminated. If decision 344 is no, the timers routine proceeds to decision step 352 at which the computer 126 determines whether the defog timer flag is true. If decision 352 is yes, the program moves to step 354 where an off routine is executed as shown in FIG. 12. Following execution of the step 354 off routine, the timers routine resumes at step 356 where the defog timer flag is set false, and the program then proceeds to the end point 350 at which the timers routine is terminated.

Referring to FIG. 12, the off routine of the computer 126 turns off all system timers and outputs. Specifically, the off routine begins at point 358 and then proceeds to step 360 where the deice relay coil 72 and the deice telltale indicator 102 are deenergized. From step 360, the program proceeds to step 362 where the fast idle command signal is extinguished. From step 362, the program proceeds to step 364 where the deice timer is reset to zero. From step 364, the program proceeds to step 366 where the crack detector delay timer is reset to zero. From step 366, the program proceeds to step 368 where the defog relay coil 76 and the defog telltale indicator 108 are deenergized. From step 368, the program proceeds to step 370 where a defog flag is set false. From step 370, the program proceeds to step 372 where the defog timer is reset to zero. From step 372, the program proceeds to step 374 where a delay routine is executed as shown in FIG. 13. The step 374 delay ensures that when the system shifts automatically from the deice mode of operation to the defog mode of operation, the deice mode is terminated before the defog mode is initiated. From step 374, the off routine proceeds to an end point 376 at which the routine is terminated.

Referring to FIG. 14, the timed deice routine begins at point 378 and proceeds directly to decision step 380 where the computer 126 determines whether the fault flag is true thereby indicating the existence of a fault. If decision 380 is yes, the deice routine proceeds immediately to an end point 382 where the routine is terminated. If decision 380 is no, the program proceeds to decision step 384 where the computer 126 determines whether the count in the deice timer is equal to zero. If decision 384 is no, the deice routine proceeds directly to the end point 382. If decision 384 is yes, the program proceeds to a decision step 386 where the computer 126 determines whether the vehicle transmission 96 is in the park or neutral condition as indicated by the potential at pin 34 which is determined by the state of transmission sensor switch 98. If decision 386 is no, the deice routine proceeds directly to the end point 382. If decision 386 is yes, the deice routine proceeds to decision step 388 at which the computer 126 determines whether the defog flag is true. If decision 388 is yes, the program proceeds to the end point 382.

If decision 388 is no, the timed deice routine proceeds to decision step 390 at which the computer 126 determines whether the count in the defog timer is equal to zero. If decision 390 is no, the deice routine proceeds directly to the end point 382. If decision 390 is yes, the program proceeds to step 392 at which the computer 126 initiates a fast idle command to the vehicle engine 28 via line 110. From step 392, the deice routine proceeds to step 394 where the deice relay coil 72 and the deice telltale indicator 102 are energized. From step 394, the deice routine proceeds to step 396 where the deice timer is set to provide the appropriate time delay, e.g., two minutes. From step 396, the deice routine proceeds to step 398 at which the crack detector delay timer is reset. From step 398, the program proceeds to the end point 382 at which the timed deice routine is terminated.

Referring to FIG. 16, the timed defog routine begins at point 400 and proceeds to step 402 at which the computer 126 deenergizes the deice relay coil 72 and deice telltale indicator 102. From step 402, the timed defog routine proceeds to step 404 at which the fast idle command to the vehicle engine 28 via line 110 is extinguished. From step 404, the timed defog routine proceeds to step 406 where a delay routine is executed as shown in FIG. 13. The step 406 delay is provided to permit the deice relay coil 72 to be deenergized and the relay contacts 74a,b,c to open before the defog relay coil 76 is energized. Following the step 406 delay, the timed defog routine proceeds to step 408 at which the defog relay coil 76 and telltale indicator 108 are energized. From step 408, the timed defog routine proceeds to step 410 at which the defog timer is set to provide the appropriate defog time period, e.g., ten minutes. From step 410, the program proceeds to step 412 at which the crack detector delay timer is reset. From step 412, the timed defog routine proceeds to an end point 414 at which the routine is terminated.

Referring to FIG. 15, the continuous defog routine begins at point 416 and proceeds to a decision step 418 at which the computer 126 determines whether the fault flag is true. If decision 418 is yes, the defog routine proceeds directly to an end point 420 at which the routine is terminated. If decision 418 is no, the program proceeds to step 422 where the deice relay coil 72 and deice telltale indicator 102 are deenergized. From step 422, the program moves to step 424 where the deice timer is reset to zero. From step 424 the program proceeds to step 426 where the fast idle command to the vehicle engine 28 via line 110 is extinguished. From step 426, the program proceeds to step 428 at which a delay routine is executed as shown in FIG. 13. The step 428 delay is provided to permit the deice relay coil 72 to be deenergized and the relay contacts 74a,b,c to open before the defog relay coil 76 is energized. Following the step 428 delay, the continuous defog routine proceeds to step 430 at which the crack detector delay timer is reset. From step 430, the program proceeds to step 432 at which the defog timer is reset to zero. From step 432, the program proceeds to step 434 where the defog flag is set true. From step 434, the routine moves to step 436 at which the computer 126 energizes the defog relay coil 76 and the defog telltale indicator 108. From step 436, the continuous defog routine proceeds to the end point 420 at which the routine is terminated.

Referring to FIG. 13, the delay routine begins at point 438 and proceeds directly to step 440 at which a register X is loaded with a reference number, e.g., 125. Thereafter, the program proceeds to step 442 where the X register is decremented by one count. From step 442, the program proceeds to decision step 444, where the computer 126 determines whether the count in the X register is equal to zero. If decision 444 is no, the program recirculates through steps 442 and 444 until the number in the X register has been decremented to zero and decision 444 is yes. Preferably, the reference number loaded into the X register at step 440 is selected such that the elapsed time required to decrement the X register by recirculating through steps 442 and 444 represents a standard time interval, e.g., one millisecond.

When decision 444 is yes, the delay routine proceeds to step 446 at which the accumulator in the central processing unit of the computer 126 is decremented by one count. Thereafter, the program proceeds to a decision step 448 at which the computer determines whether the count in the accumulator is equal to zero. If decision 448 is no, the program reverts back to step 440 and the previously described delay process is repeated. If decision 448 is yes, the program proceeds to an end point 450 at which the delay routine is terminated. It will be appreciated that the length of the delay period produced by the delay routine is determined by the number loaded into the accumulator before the delay routine is called. Preferably, this number is such as to deliver a delay of approximately 10 milliseconds when the delay routine is called during execution of the switches routine as shown in FIG. 9 (and the switch routine shown in FIG. 18) and approximately 25 milliseconds when the delay routine is called during execution of the off routine as shown in FIG. 12, the continuous defog routine as shown in FIG. 15, and the timed defog routine as shown in FIG. 16.

While the foregoing embodiment of the dual mode heated windshield control of the invention utilizes three vehicle operator actuated input switches, i.e., deice switch 94, defog switch 106 and off switch 104, an alternative embodiment utilizing a single operator actuated input switch is also possible. The single input switch embodiment may be implemented in the same manner as the three input switch embodiment with two modifications: First, the input switches 104 and 106 and associated pull-up resistors 136 and 138 are eliminated from FIG. 5 thereby yielding the modified computer implementation shown in FIG. 17 where the single input switch is the former deice input switch 94. Second, the switches routine shown in FIG. 9 is replaced by a substitute switch routine as shown in FIG. 18.

Referring to FIG. 18, the switch routine begins at point 452 and proceeds directly to decision step 454 at which the computer 126 determines whether the single input switch 94 is closed as indicated by the potential at pin 36. If decision 454 is no, the program proceeds to decision step 456 where the computer 126 determines whether a switch flag has been set. If decision 456 is no, the program proceeds immediately to an end point 458 at which the switch routine is terminated. If decision 456 is yes, the program moves to step 460 at which a 25 millisecond delay routine is executed as shown in FIG. 13. Following the step 460 delay, the switch routine proceeds to step 462 at which the switch flag is cleared, and then the program proceeds to the end point 458. If decision 454 is yes, the program moves to a decision step 464 where the computer 126 determines if the switch flag is set. If decision 464 is yes, the program proceeds to the end point 458. If decision 464 is no, the program moves to step 466 at which 25 millisecond delay routine is executed as shown in FIG. 13, and then the switch routine proceeds to decision step 468.

At decision step 468 of the switch routine, the computer 126 determines whether the input switch 94 is still closed. If decision 468 is no, the program moves directly to the end point 458. If decision 468 is yes, the program proceeds to step 470 at which the switch flag is set. From step 470, the program moves to decision step 472 at which the computer 126 determines whether the heated windshield system is off or deenergized. If decision 472 is no, the switch routine proceeds to step 474 at which an off routine is performed as illustrated in FIG. 12. Following the step 474 off routine, the program proceeds to the end point 458.

If decision 472 is yes, the switch routine proceeds to a decision step 476 at which the computer 126 determines whether the vehicle transmission 96 is in the park or neutral condition as indicated by the state of transmission sensor switch 98 at pin 34. If decision 476 is yes, the program moves to step 478 at which a timed deice routine is executed as shown in FIG. 14. Following the step 478 deice routine, the switch routine proceeds to the end point 458 at which the routine is terminated. Conversely, if decision 476 is no, the program moves to step 480 at which a continuous defog routine is executed as shown in FIG. 15. Following the step 480 defog routine, the switch routine proceeds to the end point 458 at which the routine is terminated.

It will now be appreciated that the single switch embodiment is characterized by a timed cycle and a continous cycle. The timed cycle is initiated in response to an initial operator closure of the input switch 94 when the vehicle transmission 96 is in the park or neutral condition (thereby providing a deice command) and thereafter may be terminated at any time in response to a subsequent operator closure of the input switch 94 (thereby providing an off command). The timed cycle includes (unless earlier terminated) a high heat deice mode of operation which is initiated when the timed cycle is initiated and which is terminated in response to the first to occur of expiration of a predetermined deice time period after initiation, or shifting of the transmission 96 to other than the park or neutral condition. The timed cycle further includes (unless earlier terminated) a low heat defog mode of operation which is initiated in response to termination of the deice mode of operation and which is terminated at the expiration of a predetermined defog time period after initiation. The continuous cycle is initiated in response to an initial operator closure of the input switch 94 when the vehicle transmission 96 is in other than the park or neutral condition (thereby providing a defog command) and is thereafter terminated in response to a subsequent operator closure of the input switch 94 (thereby providing an off command). The continuous cycle consists of the low heat defog mode of operation which is initiated when the continous cycle is initiated and which is terminated when the continuous cycle is terminated.

It is to be noted that the foregoing embodiments of the invention are disclosed for purposes of illustration only and are not intended to limit the invention. As will be appreciated by those skilled in the art, various alterations to the illustrated embodiments may be made without departing from the spirit and scope of the invention.

The embodiments of the invention in which an exclusive property or privilege is claimed are defined as follows:

1. A dual mode method of operating a windshield heater element in an automotive vehicle, the method comprising the steps of:
   initiating a deice mode of operation in which the heater element is energized with maximum voltage to develop maximum heat effective to remove ice and frost from the exterior surface of the windshield in response to an operator actuated deice input;
   terminating the deice mode of operation in response to the first to occur of (a) expiration of a predetermined time period after initiation, or (b) an operator actuated off input;
   initiating a defog mode of operation in which the heater element is energized with reduced voltage to develop reduce heat effective to remove condensation from the interior surface of the windshield or to help prevent the formation of ice and frost on the exterior surface of the windshield in response to (a) an operator actuated defog input, or (b) termination of a preceding deice mode of operation provided that such termination was not in response to an operator actuated off input; and
   terminating the defog mode of operation in response to the first to occur of (a) the expiration of a predetermined time period after initiation provided that such initiation was not in response to an operator actuated defog input, or (b) an operator actuated off input.

2. A dual mode method of operating a windshield heater element in an automotive vehicle having a transmission operable between park, neutral and one or more drive states, the method comprising the steps of:
   initiating a deice mode of operation in which the heater element is energized with maximum voltage to develop maximum heat effective to remove ice and frost from the exterior surface of the windshield in response to an operator actuated input when the transmission is in the park or neutral state;
   terminating the deice mode of operation in response to the first to occur of (a) expiration of a predetermined time period after initiation, or (b) an operator actuated input, or (c) shifting of the transmission to other than the park or neutral state;
   initiating a defog mode of operation in which the heater element is energized with reduced voltage to develop reduce heat effective to remove condensation from the interior surface of the windshield or to help prevent the formation of ice and frost on the exterior surface of the windshield in response to (a) an operator actuated input when the transmission is in other than the park or neutral state, or (b) termination of a preceding deice mode of operation provided that such termination was not in response to an operator actuated input; and
   terminating the defog mode of operation in response to the first to occur of (a) the expiration of a predetermined time period after initiation provided that such initiation was not in response to an operator actuated input, or (b) an operator actuated input.

3. A dual method of operating a windshield heater element in an automotive vehicle having a transmission operable between park, neutral and one or more drive states, and having a generator driven by the vehicle engine for providing electrical power to charge the vehicle battery and to energize the heater element with a load current, where the magnitude of the electrical power is dependent upon the idle speed of the engine when the transmission is in the park or neutral state, the method comprising the steps of:
   initiating a deice mode of operation in which the heater element is energized at maximum power to produce maximum heat effective to remove ice and frost from the exterior surface of the windshield in response to an operator actuated deice command provided that the transmission is in the park or neutral state so that the vehicle engine is operating at idle;
   terminating the deice mode of operation in response to the first to occur of (a) expiration of a predetermined time period after initiation, (b) shifting of the transmission to other than the park or neutral state, or (c) an operator actuated off command;
   initiating a defog mode of operation in which the heater element is energized at reduced power to produce reduced heat effective to remove condensation from the interior surface of the windshield or to help prevent the formation of ice and frost on the exterior surface of the windshield in response to (a) an operator actuated defog command, or (b) termination of a preceding deice mode of operation provided that such termination was not in response to an operator actuated off command;
   terminating the defog mode of operation in response to the first to occur of (a) expiration of a predetermined time period after initiation provided that such initiation was not in response to an operator actuated defog command, or (b) an operator actuated off command; and
   increasing the idle speed of the engine above the normal idle speed in response to initiation of the deice mode of operation to ensure adequate power output from the engine driven generator during such maximum power deice mode of operation.

4. A dual mode method of operating a windshield heater element in an automotive vehicle having a transmission operable between park, neutral and one or more drive states, the method comprising the steps of:

initiating a timed cycle in response to an operator actuated input when the transmission is in the park or neutral state;

the timed cycle including a high heat mode of operation which is initiated when the timed cycle is initiated and which is terminated in response to the first to occur of expiration of a predetermined time period after initiation, or shifting of the transmission to other than the park or neutral state;

the timed cycle further including a low heat mode of operation which is initiated in response to termination of the high heat mode of operation and which is terminated at the expiration of a predetermined time period after initiation.

5. A dual mode method of operating a windshield heater element in an automotive vehicle having a transmission operable between park, neutral and one or more drive states, and having a generator driven by the vehicle engine for providing electrical power to charge the vehicle battery and to energize the heater element with a load current, where the magnitude of the electrical power is dependent upon the idle speed of the engine when the transmission is in the park or neutral state, the method comprising the steps of:

initiating a timed cycle in response to an initial operator actuated input when the transmission is in the park or neutral state and terminating the timed cycle in response to a subsequent operator actuated input;

the timed cycle including (unless earlier terminated) a high heat mode of operation which is initiated when the timed cycle is initiated and which is terminated in response to the first to occur of expiration of a predetermined time period after initiation, or shifting of the transmission to other than the park or neutral state;

the timed cycle further including (unless earlier terminated) a reduced heat mode of operation which is initiated in response to termination of the high heat mode of operation and which is terminated a predetermined time period after initiation; and initiating a continuous cycle in response to an initial operator actuated input when the transmission is in other than the park or neutral state and terminating the continuous cycle in response to a subsequent operator actuated input;

the continuous cycle consisting of a reduced heat mode of operation which is initiated when the continuous cycle is initiated and which is terminated when the continuous cycle is terminated.

6. A dual mode method of operating a windshield heater element in an automotive vehicle having a transmission operable between park, neutral and one or more drive states and having a single operator actuated input switch, the method comprising the steps of:

initiating a timed cycle in response to an initial operator actuation of the single input switch when the transmission is in the park or neutral state and terminating the timed cycle in response to a subsequent operator actuation of the input switch;

the timed cycle including (unless earlier terminated) a high heat deice mode of operation effective to remove ice and frost from the exterior surface of the windshield where such deice mode of operation is initiated when the timed cycle is initiated and is terminated in response to the first to occur of expiration of a predetermined time period after initiation, or shifting of the transmission to other than the park or neutral state;

the timed cycle further including (unless earlier terminated) a low heat defog mode of operation effective to remove condensation from the interior surface of the windshield or to help prevent the formation of ice and frost on the exterior surface of the windshield where such defog mode of operation is initiated in response to termination of the high heat mode of operation and which is terminated at the expiration of a predetermined time period after initiation; and initiating a continuous cycle in response to an initial operator actuation of the single input switch when the transmission is in other than the park or neutral state and terminating the continuous cycle in response to a subsequent operator actuation of the input switch:

the continuous cycle consisting of a low heat defog mode of operation which is initiated when the continuous cycle is initiated and which is terminated when the continuous cycle is terminated.

7. A dual mode method of operating a windshield heater element in an automotive vehicle having a transmission operable between park, neutral and one or more drive states, and having a generator driven by the vehicle engine for providing electrical power to charge the vehicle battery and to energize the heater element with a load current, where the magnitude of the electrical power is dependent upon the idle speed of the engine when the transmission is in the park or neutral state, the method comprising the steps of:

initiating a timed cycle in response to an initial operator actuated input when the transmission is in the park or neutral state and terminating the timed cycle in response to a subsequent operator actuated input;

the timed cycle including (unless earlier terminated) a maximum power mode of operation which is initiated when the timed cycle is initiated and which is terminated in response to the first to occur of expiration of a predetermined time period after initiation, or shifting of the transmission to the park or neutral state; state;

the timed cycle further including (unless earlier terminated) a reduced power mode of operation which is initiated in response to termination of the maximum power mode of operation and which is terminated a predetermined time period after initiation;

initiating a continuous cycle in response to an initial operator actuated input when the transmission is in other than the park or neutral state and terminating the continuous cycle in response to a subsequent operator actuated input;

the continuous cycle consisting of a reduced power mode of operation which is initiated when the continuous cycle is initiated and which is terminated when the continuous cycle is terminated; and increasing the idle speed of the engine above the normal idle speed in response to initiation of the maximum power mode of operation to ensure adequate power output from the engine driven generator during the maximum power mode of operation.

8. The method of any preceding claim further including the step of prohibiting further energization of the heater element when the temperature of the windshield is abnormally high.

9. The method of any preceding claim further including the step of prohibiting further energization of the heater element when the voltage of the vehicle battery is abnormally low.

10. The method of any preceding claim further including the step of prohibiting further energization of the heater element when the load current through the heater element is either abnormally high or abnormally low.

* * * * *